(12) United States Patent
Henderson et al.

(10) Patent No.: US 10,067,654 B2
(45) Date of Patent: Sep. 4, 2018

(54) SYSTEM FOR ENHANCED DISPLAY OF INFORMATION ON A USER DEVICE

(71) Applicant: BILT, Inc., Keller, TX (US)

(72) Inventors: Nathan Henderson, Vail, AZ (US); Santosh Sathyaprakash Kikkeri, Foster City, CA (US); Natasha Lloyd, Ashaland, MA (US); Michael Richard Wencel, West Olive, MI (US)

(73) Assignee: BILT Incorporated, Keller, TX (US)

( * ) Notice: Subject to any disclaimer, the term of this patent is extended or adjusted under 35 U.S.C. 154(b) by 66 days.

(21) Appl. No.: 14/976,270

(22) Filed: Dec. 21, 2015

(65) Prior Publication Data

US 2016/0328198 A1 Nov. 10, 2016

Related U.S. Application Data

(60) Provisional application No. 62/156,691, filed on May 4, 2015.

(51) Int. Cl.
| | |
|---|---|
| *G06F 3/00* | (2006.01) |
| *G06F 3/0484* | (2013.01) |
| *G06Q 30/00* | (2012.01) |
| *G06F 17/30* | (2006.01) |

(52) U.S. Cl.
CPC ...... *G06F 3/0484* (2013.01); *G06F 17/30879* (2013.01); *G06Q 30/00* (2013.01)

(58) Field of Classification Search
CPC combination set(s) only.
See application file for complete search history.

(56) References Cited

U.S. PATENT DOCUMENTS

| | | | |
|---|---|---|---|
| 2005/0038860 A1* | 2/2005 | Helal | A61B 5/0062 709/206 |
| 2013/0032634 A1* | 2/2013 | McKirdy | G06Q 30/0271 235/375 |
| 2013/0061138 A1* | 3/2013 | Spector | G06F 17/21 715/256 |
| 2013/0069781 A1* | 3/2013 | Terwilliger | G06Q 10/08 340/539.13 |
| 2013/0069794 A1* | 3/2013 | Terwilliger | G06Q 10/08 340/815.45 |

(Continued)

*Primary Examiner* — Hien L Duong
(74) *Attorney, Agent, or Firm* — Attentive Law; Paul Ratcliffe

(57) ABSTRACT

A method and corresponding apparatus configured for enabling the enhanced dissemination and display of information on a user device. Using an acquiring device (e.g., a wireless device), a user may obtain various artifacts (e.g., CAD files, BOMs, manuals, technical documentation, etc.) relating to a specific aspects of an object. The artifact may be, for example, a Quick Response code located on the object. The system communicates with receives information from various external data sources, i.e., a manufacturer or retailer, related to the object. The system modifies the received information, developing or generating an array of follow-on or supplementary interactive materials, activities, information, etc. Depending on the artifact acquired by the user and submitted to the system, the corresponding modified information may then be dynamically displayed to the user through, for example, the display of a wireless device of the user.

20 Claims, 14 Drawing Sheets

(56) References Cited

U.S. PATENT DOCUMENTS

| | | | | |
|---|---|---|---|---|
| 2013/0087608 A1* | 4/2013 | Addy | ................ | G06F 17/30879 |
| | | | | 235/375 |
| 2013/0146653 A1* | 6/2013 | Hart | ........................ | G06F 17/30 |
| | | | | 235/375 |
| 2013/0148891 A1* | 6/2013 | Yassin | .................... | G06Q 10/00 |
| | | | | 382/190 |
| 2013/0185288 A1* | 7/2013 | Nishiyama | ........ | G06F 17/30554 |
| | | | | 707/722 |
| 2014/0189792 A1* | 7/2014 | Lesavich | .......... | G06F 17/30864 |
| | | | | 726/3 |
| 2014/0229251 A1* | 8/2014 | Lim | ................... | G06Q 30/0252 |
| | | | | 705/14.5 |
| 2014/0272817 A1* | 9/2014 | Park | ........................ | G09B 5/02 |
| | | | | 434/127 |
| 2014/0281855 A1* | 9/2014 | Bhatnagar | ......... | G06F 17/30879 |
| | | | | 715/205 |
| 2016/0314276 A1* | 10/2016 | Wilz, Sr. | ................ | G08B 21/24 |

* cited by examiner

SYSTEM FOR ENHANCED DISPLAY OF INFORMATION ON A USER DEVICE

RELATED APPLICATIONS

This application claims priority to U.S. Patent Application Ser. No. 62/156,691, filed on May 4, 2015, the content of which is incorporate herein in its entirety.

TECHNICAL FIELD

The present disclosure relates to delivering information about a product, service, etc. to a user and enabling access by the user to an array of follow-on or supplementary information or interactive activities related to the product, service, etc.

BACKGROUND

People are increasingly relying on mobile devices. They use them to make telephone calls, send messages, take pictures, play games, interact using social media, and use the devices to obtain maps and directions, among many other uses. At the same time, mobile device capabilities continue to expand. Whereas in recent years one might only be able to make a telephone call using a mobile device, processing power, battery life, graphics and touch screen technology, among other advances, have enabled mobile device users access to a richer overall experience.

DESCRIPTION OF EXAMPLE EMBODIMENTS

Figure 1:
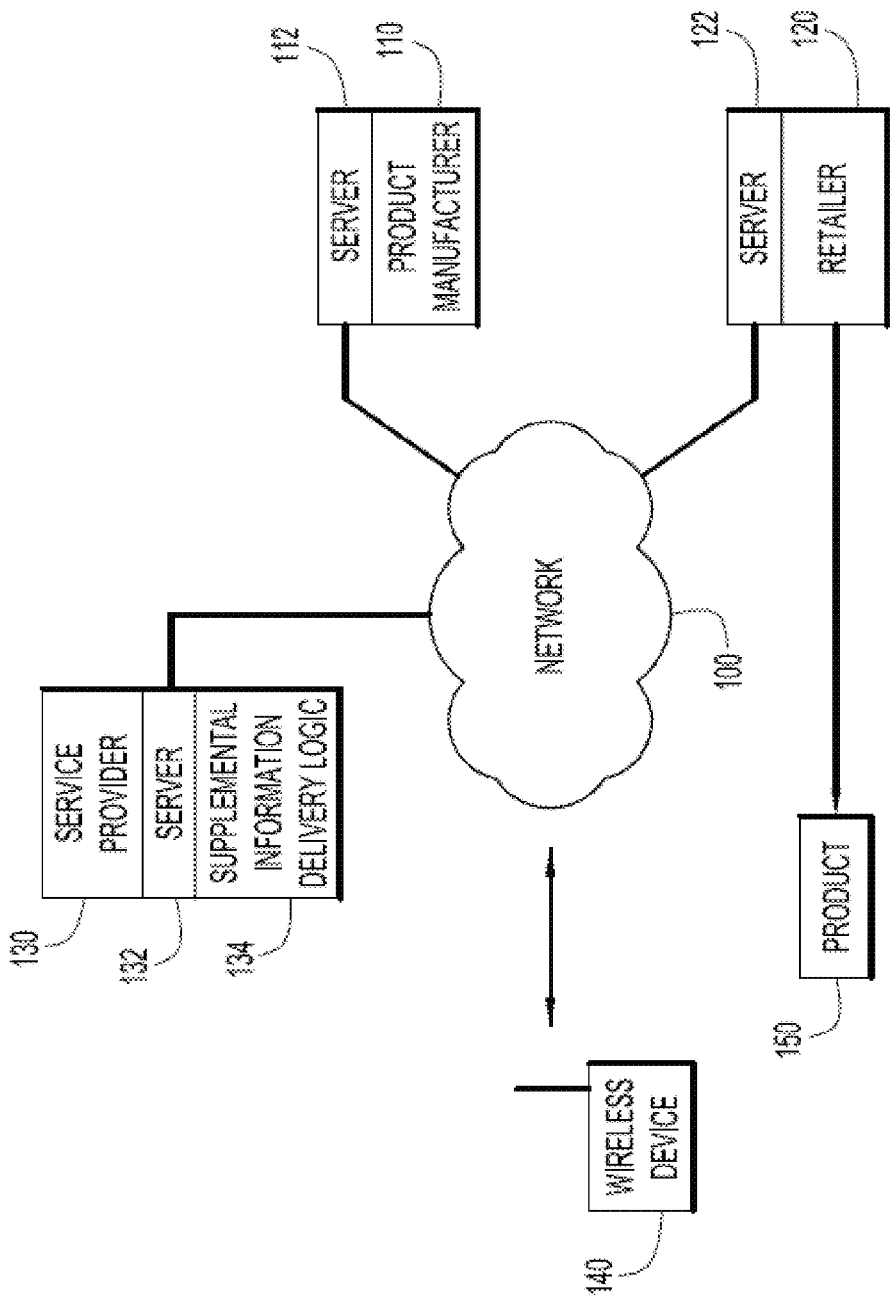
FIG. 1 shows an example network topology and entities that are employed to deliver information about a product and enable access to an array of follow-on or supplementary interactive activities related to the product or service according to techniques described herein.

For simplicity of exposition the discussion below will have principally a consumer orientation. It is important to note that it will be readily apparent to one of ordinary skill in the relevant art that numerous other orientations are easily possible including inter alia service technicians, industrial professionals, assembly line workers, health care providers, customer service or care representatives, field service or support personnel, etc.

The enhanced information delivery facilities described herein may be referred to variously as inter alia "SAP SNAP," "SNAP," "SAP BILT," or "BILT."

The techniques described hereinafter relate to providing information to a user, such as a consumer or a customer, about a product or service, and then, e.g., after purchase and receipt of that product or service, enabling the user to access an array of follow-on or supplementary interactive activities and/or information related to the product or service.

Features of the several techniques described herein may be understood, at a high level, through the following hypothetical example:

Consider a user who is watching television and sees an advertisement for a product, e.g., a child's tricycle. The product is of interest to the user and, as a result, she uses her wireless device to scan a Quick Response (QR) code that is displayed in the advertisement. A QR code is a two-dimensional form of a bar code and has seen increased usage in recent years. Smartphones (one type of wireless device) can execute an application known as a QR-code scanner that can read a displayed code and convert it to, e.g., a universal resource locator (URL) directing the smartphone's browser to the website of a company, store, or product associated with that code, such that the user can obtain specific information about the product being advertised.

By accessing the website associated with the scanned QR code, the user's wireless device may display any number of things including, but not limited to, information such as images, video clips, descriptions, specifications, price, availability, reviews, ratings, etc. about, in this case, the tricycle. The user may, by manipulating the wireless device's browser, among other things, peruse, navigate, drill-down into, comparison shop with, etc. the information supplied via the accessed URL.

Continuing with the instant hypothetical, the user decides that she likes the tricycle and thus further employs her wireless device to buy the tricycle by selecting, e.g., a "Purchase" option that is displayed with the information on the tricycle.

The purchase may occur in a conventional fashion by having the user enter credit, address, and shipping information, which information is stored by the retailer and/or an intermediary electronic sales transaction service, which may be the "service provider" explained in more detail later herein.

At some future point, the tricycle arrives at the user's house in a box, but in disassembled form. That is, the tricycle requires assembly. To assist in the assembly process, the user again employs her wireless device to scan a QR code that is displayed, e.g., on the box in which the tricycle arrived, or on other materials provided with the tricycle.

In response to the QR code scan, a rich body of detailed, step-by-step, etc. assembly information (such as, for example, images, video clips, audio clips, two dimensional and three dimensional drawings, exploded views, detailed part drawings, Frequently Asked Questions (FAQs), tips and tricks, tool recommendations, part/fastener/etc. size guides, etc.) for the tricycle may be displayed or selectable on the user's wireless device and she may, as desired, peruse, navigate, drill-down into, advance, pause, repeat, zoom into or out of, rotate, explore, etc. that information as it guides her through the assembly process.

During an assembly process a user may optionally seamlessly elect to receive, purchase, etc. a replacement for a missing, damaged, incorrectly supplied, etc. part or parts.

In accordance with still further techniques described herein, within the assembly information may be, for example, a coupon for yet another (perhaps related) product, such as a helmet, may be presented. After clicking on the coupon or helmet to learn more about the product (through, e.g., images, video clips, description, specification, price, availability, reviews, ratings, etc. that are delivered to her wireless device) the user may once again use her wireless device to proceed to purchase the helmet. That is, in accordance with the techniques described herein, another product (the helmet) is purchased as a result of the user receiving some type of follow-on or supplemental information related to a product that was previously purchased (the tricycle).

During an assembly process a user may optionally provide feedback, comments, etc. on the process and/or specific steps of the process (e.g., what went well, what worked as described, what did not go properly, was a particular step not well described, etc.). Such material may include inter alia audio (e.g., a voice note), pictures and/or video (e.g., from a camera on or in a user's wireless device), etc.

After the user finishes assembling the tricycle she may still further use her wireless device to complete several additional tasks (where triggering links for such tasks or activities may be provided as part of supplemental information that is delivered to the user's wireless device). Such tasks or activities can include:

1) Reviewing and rating the tricycle (e.g., through the retailer from whom she purchased the tricycle;

2) Submitting product registration and warranty information (e.g., to the manufacturer of the tricycle or a third party);

3) Electing to purchase a service plan (e.g., that is offered by a third party); and 4) Completing a customer satisfaction survey.

As will be apparent to those skilled in the art and in view of the more detailed explanation to follow, the example that was presented above is illustrative only and numerous variations and alternatives may be implemented.

Additionally, the user may automatically receive and/or manually request information on the proper, safe, etc. use of the tricycle.

Such information may demonstrate, explain, illustrate, etc. inter alia proper safety procedures such as wearing a helmet; stopping and looking when near a sidewalk or street; etc., how to ride the tricycle; how to use the tricycle's brakes, kickstand, etc.; and so forth.

Such information may include, among other things, a rich body of detailed, step-by-step, etc. use information (such as for example images, video clips, audio clips, two dimensional and three dimensional drawings, exploded views, detailed part drawings, Frequently Asked Questions (FAQs), tips and tricks, etc.) for the tricycle that may be displayed on a user's wireless device. A user may peruse, navigate, drill-down in to, advance, pause, repeat, zoom in to or out of, rotate, explore, etc. that information as it guides her through the use discovery, learning, etc. process.

Within the above information may reside an artifact (such as for example and inter alia an advertisement, a coupon, etc.) for associated or related parts, services, etc. After clicking on a part or service or an artifact to learn more about it (through images, video clips, description, specification, price, availability, reviews, ratings, etc. that are delivered to the user's wireless device) the user may use her wireless device to select the artifact and/or part or service and complete a purchase process.

At some point in the future the user may need to troubleshoot some aspect of the tricycle, complete some repair to the tricycle, etc. and among other things she may request information on disassembly, replacement, repair, problem solving, etc. procedures.

Such information may include, among other things, a rich body of detailed, step-by-step, etc. disassembly, removal, replacement, repair, upgrade, troubleshooting, etc. information (such as for example images, video clips, audio clips, two dimensional and three dimensional drawings, exploded views, detailed part drawings, Frequently Asked Questions (FAQs), tips and tricks, tool requirements, etc.) that may be displayed on a user's wireless device. A user may peruse, navigate, drill-down in to, advance, pause, repeat, zoom in to or out of, rotate, explore, etc. that information as it guides her through the disassembly, repair, replacement, upgrade, reassembly, etc. process.

Within the above information may reside an artifact (such as for example and inter alia an advertisement, a coupon, etc.) for associated or related replacement, upgrade, etc. parts or services. After clicking on a part or service or an artifact to learn more about it (through images, video clips, description, specification, price, availability, reviews, ratings, etc. that are delivered to the user's wireless device) the user may use her wireless device to select the artifact and/or part or service and complete a purchase process.

During a user's ownership, use, etc. of a product or service the user may be notified when it is time to replace a part, perform preventive maintenance, obtain scheduled service, etc. Such a notification may include inter alia descriptive information, a coupon, advertising, details for a local provider or resource, etc.

During any of the assembly, use, repair, etc. processes and exchanges that were described above a user may among other things elect to speak with a support representative by inter alia dialing an indicated telephone number, requesting that they be called, selecting a displayed button/link/option/ etc., etc. Such a capability may leverage among other things audio and/or video communication channels through third-party services such as for example Skype, Facetime, etc. During such a communication session a support representative may automatically ascertain the current status of the user's efforts; may ask that a user send the support representative a description, picture, video, etc. through the user's wireless device (and for example a camera on or in same); etc.

During any of the assembly, use, repair, etc. processes and exchanges that were described above a user may elect to engage, post to, search, etc. one or more social media sources for among other things information, community consensus, support, etc.

During any of the assembly, use, repair, etc. processes and exchanges that were described above a user may issue a voice command to among other things request further information, identify a step, identify an issue, request assistance, etc.

During any of the assembly, use, repair, etc. processes and exchanges that were described above a user may be presented with information on, a coupon for, ratings of, etc. one or more local service providers, resources, etc. who may among other things assist with an assembly, installation, repair, replacement, upgrade, etc. process.

In brief, the user can be seamlessly and ubiquitously guided through the entire lifecycle of her engagement with a product or service, spanning inter alia:

1) Her browsing for and securing information on a product or service (leveraging among other things Web-based resources, social media sources, etc.), 2) Her purchase of a product or service, 3) Her tracking of the current status, etc. of the delivery of a product or service, 4) Her scheduling among other things delivery, installation, etc. appointments, 5) Complete, comprehensive, and singular assistance with her assembly, installation, activation, etc. of a product or service leveraging among other things creatively presented bite-sized pieces of information (such as inter alia text, images, audio, video, etc.) that are not overwhelming and which may be controlled, acted upon, etc. at a user's pace.

6) Assistance with her completion, submission, activation, etc. of registration, warranty, service plan, feedback, survey, etc. programs or offerings, 7) Complete, comprehensive, and singular assistance with her use of a product or service (through for example and inter alia dynamic, interactive, etc. 'How To' guides), 8) Her browsing for and securing information on a replacement, upgrade, etc. option or offering (such as for example browsing for, identifying, and securing or purchasing a part or component), 9) Her navigating a request to or submission under a warranty, repair, etc. program, 10) Complete, comprehensive, and singular assistance with her repair, replacement, upgrade, etc. of a product or service, and, 11) Her safely and properly disposing, recycling, etc. of a product or service, with among other things assurance that the provided materials, artifacts, assistance, etc. (such as inter alia assembly, installation, use, repair, replacement, etc. instructions, diagrams, video clips, drawings, FAQs, etc.) are current and never out of date, stale, etc.

Example embodiments of a system and methods for teaching product assembly and/or repair through interactive presentations will be described below in connection with various graphical user interfaces (GUIs). For simplicity, the GUIs and methods will be described mainly in reference to product assembly tasks. However, it will be understood that the example embodiments, including the GUIs and methods, are equally applicable to a range of alternatives including inter alia installation, disassembly, repair, service, replacement, etc.

In an example embodiment, an interactive presentation may include an instructional video showing each step required to complete an assembly or repair of a particular product. The video may be viewed in a conventional, static fashion. A user may interact with the video by, for example, pausing the video to examine a product part in closer detail, fast forwarding rewinding etc.

In an example embodiment, the presentation may involve a range of Two-Dimensional (2D) and/or Three-Dimensional (3D) artifacts such as for example a model of the product, a depiction of an assembly process, a detailed presentation of an assembly step, a depiction of an individual part or component, etc. The user may interact with the presentation by virtually manipulating the model, for example, rotating or moving individual parts, and zooming in or out of a current view. Thus, the model may be viewed from different perspectives, e.g. during video playback. Similar manipulation may occur when the user attempts to virtually assemble the product.

Reference is now made to FIG. 1, which shows an example network topology including entities that are employed to deliver information about a product and enable access to an array of follow-on or supplementary interactive activities or information related to that product or service.

More specifically, FIG. 1 depicts a network 100, which could be a private network, or is more likely a public network such as the Internet, that enables data communications among multiple entities. A product manufacturer 110 manufactures one or more products that may be of interest to consumers. It is noted that the example herein focuses on manufactured "hard goods," but those skilled in the art will appreciate that the techniques and methodologies described herein are equally applicable to "electronic goods" such as e-books, music, movies or any other like "product" that can be delivered via an electronic network. As shown, product manufacturer 110 is in communication with network 100 via server 112.

A retailer 120 may be a conventional brick and mortar retailer or an on-line retailer, and retailer 120 is in communication with network 100 via server 122. Retailer may have a presence on the World Wide Web enabling consumers to access the retailer's website to obtain information about products and services offered by retailer 120.

A service provider 130, which is in communication with network 100 via server 132, enables, through supplemental information delivery logic 134 (described more fully below), many of the techniques and methodologies described herein.

Finally, FIG. 1 shows a wireless device 140 that is operated by a user. Wireless device 140 may communicate via wireless network services provided by a wireless telecommunications network (not shown), or may instead communicate using wireless fidelity (Wi-Fi) or other similar wireless communication techniques. Wireless device 140 may be any combination of one or more of inter alia a mobile phone, a feature phone, a smartphone, a tablet computer (such as for example an iPad™), a wearable device (such as for example a smartwatch), a mobile computer, a handheld computer, a laptop computer, an in-vehicle/in-appliance/etc. device, a Personal Digital Assistant (PDA), a game console, a Digital Video Recorder (DVR) or Personal Video Recorder (PVR), cable system or other set-top-box, an entertainment system component such as a television set, etc.

A product 150 (e.g., the tricycle described above) is shown adjacent wireless device 140.

Figure 14:
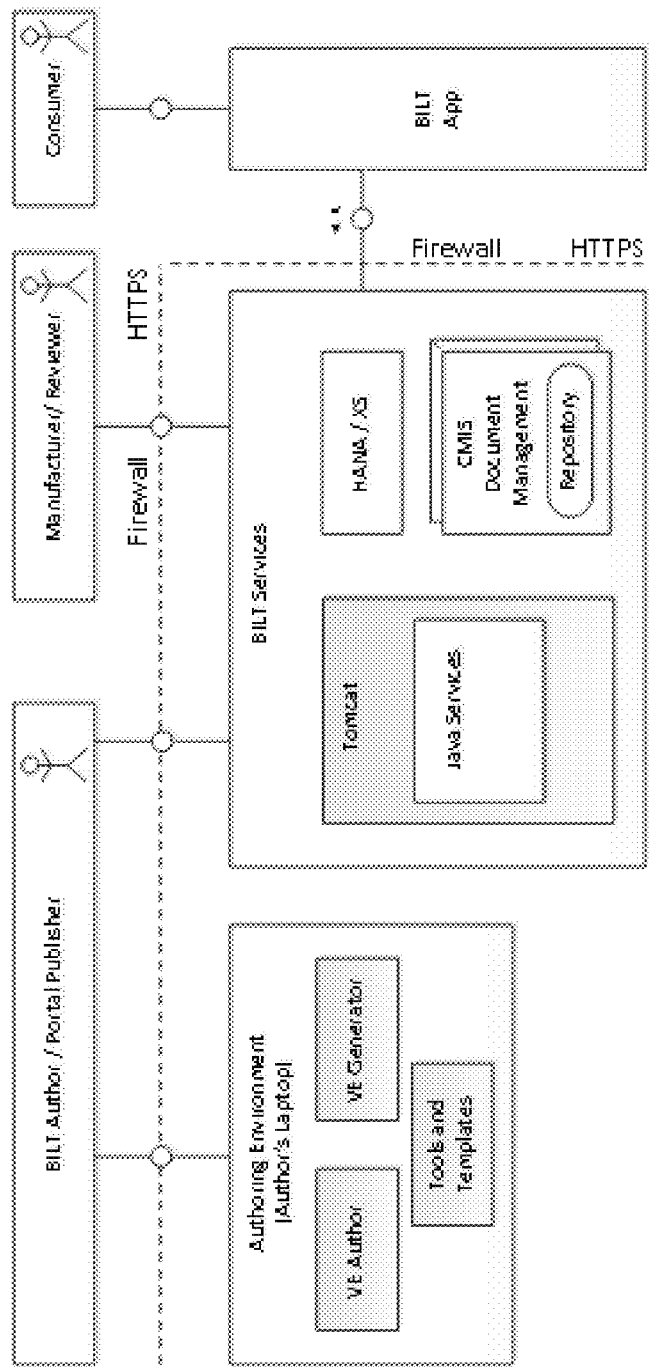
FIG. 14 depicts aspects of a logical architecture that may be available in accordance with the techniques described herein.

FIG. 14 depicts aspects of one logical architecture that may be employed during the implementation, realization, etc. of aspects of FIG. 1.

Figure 2:
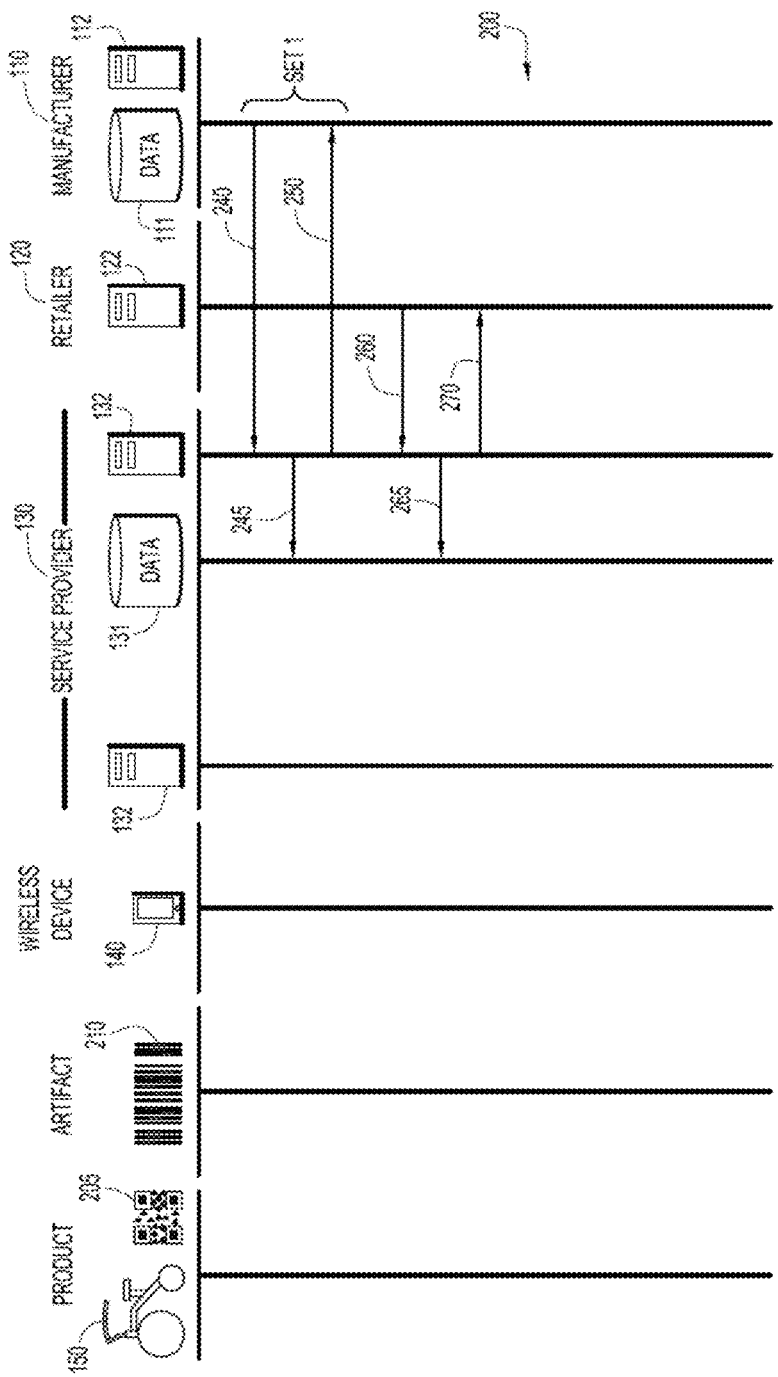
FIG. 2 shows an example ladder diagram that depicts an initial delivery of information from a product manufacturer and retailer to a service provider in accordance with the techniques described herein.

FIG. 2 shows an example ladder diagram that depicts an initial delivery of information from product manufacturer 110 and retailer 122 to service provider 130. Specifically, the interactions that are collected under designated Set 1 in FIG. 2 represent several activities that might take place.

Figure 3:
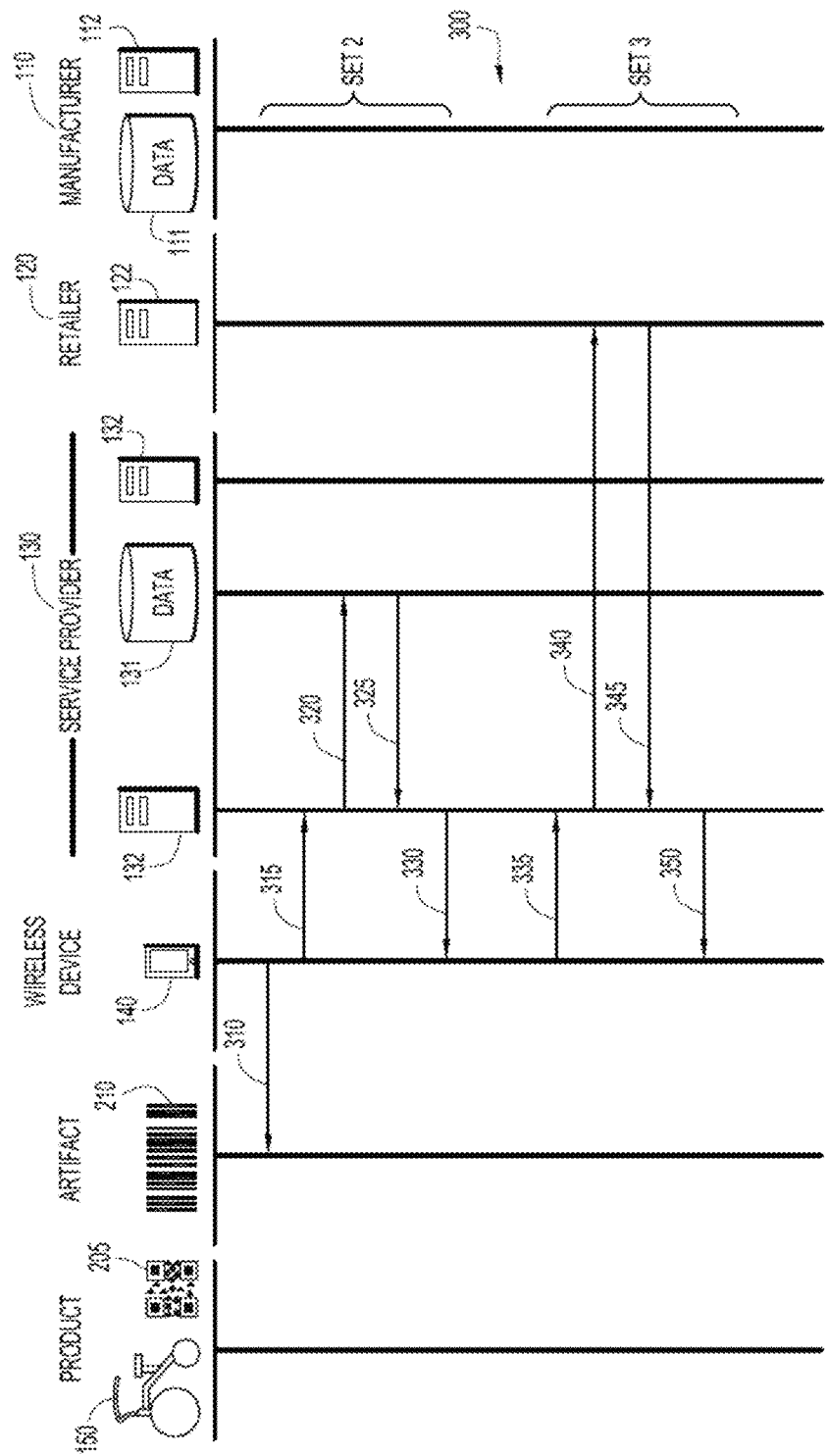
FIG. 3 shows an example ladder diagram that depicts communication exchanges among a user, the service provider or a retailer in accordance with the techniques described herein.
Figure 4:
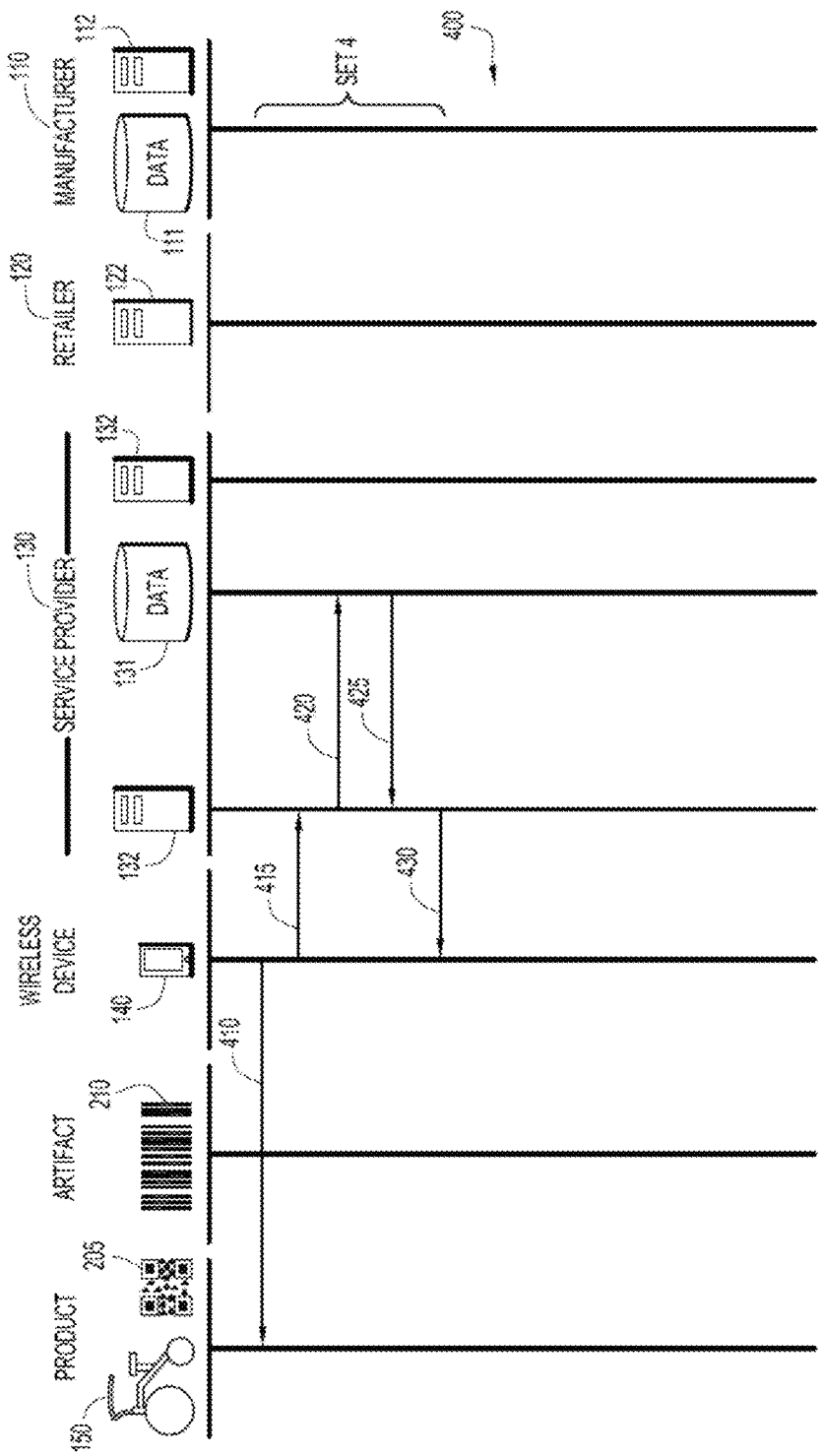
FIG. 4 shows an example ladder diagram that depicts communication between the user and the service provider to deliver information about a product and enable access to an array of follow-on or supplementary interactive activities in accordance with the techniques described herein.

For instance, at 240, product manufacturer 110 opens or establishes a communication channel to service provider 130 and sends, conveys, transfers, etc. to service provider 130 various forms of information (such as, e.g., Computer Aided Design (CAD) files, Bills of Material (BOMs), component part data, manuals, technical documentation, etc.) that it may maintain in, e.g., database 111, for a given product 150 (e.g., the tricycle in the earlier example). The above activity may employ any combination of one or more mechanisms including possibly inter alia an Application Programming Interface (API), an Electronic Data Interchange (EDI) facility, one or more proprietary or standards-based protocols, a (courier, overnight, etc.) delivery service, postal mail, etc. As shown, the information delivered at 240 is received by server 132 of service provider 130 and may be stored in a database 131, as indicated by 245. It is noted that server 132 in FIGS. 2-4 is shown twice under the service provider, but merely for ease of illustration. In an actual implementation server 132 may be configured as a single device, or as multiple devices. The relevant feature is that service provider 130 operates one or more servers, generally designated as 132. It is noted that the delivery or conveyance of the various forms of information may be push-based (i.e., initiated by manufacturer 110) pull-based (i.e., initiated by service provider 130) or any combination of push and/or pull.

Service provider 130 may process, manipulate, transform, etc. the received information/materials (including performing compression and optimization of the received information/materials) yielding possibly inter alia a range of generated materials such as for example video recordings, audio recordings, (two dimensional, three dimensional, etc.) diagrams or illustrations, line drawings, exploded drawings, detailed part drawings, FAQs, tips and tricks, tool recommendations, part/fastener/etc. size guides, etc. The received information/material may also include data, material, information, etc. that supports a text-to-speech, speech synthesis, etc. facility. The creation of the generated materials may leverage, draw upon, etc., among other things, various data sources within service provider 130 (including supplemental information delivery logic 134) and/or various data sources external to service provider 130. For example, service provider 130 may generate a set of rich materials (including inter alia video and audio recordings like those listed above) that support inter alia the use, repair, upgrade or enhancement, etc. of, e.g., product 150. Such rich material may leverage, incorporate, etc., information on among other things third party parts, products, services, etc. In other words, service provider 130 (and particularly supplemental information delivery logic 134) may be configured to gather, synthesize, organize, and present materials that would be of interest to a purchaser of product 150, at the time of purchase (e.g., within hours or days), soon after purchase (e.g., within days or weeks) or well-after purchase (e.g., days, weeks or years).

Data sources external to a service provider may include inter alia manufacturers, distributors, retailers, consumers, product or service owners, feeds or content from social media sources, material from sites on the World Wide Web, etc.

The generated materials may include inter alia assembly instructions; use instructions (such as for example guided information on the use of a product or service and each step, component, element, etc. of same); repair, replacement, upgrade, problem solving, troubleshooting, etc. instructions; disposal or recycling instructions; etc.

In one possible implementation, service provider 130 accepts a CAD file and makes graphical improvements to it ranging from colors and shadowing to correct orientation and sequencing of the assembly parts. Once completed, the file is converted to one or more formats which can be provided to any mobile device or computer. The file may be compressed so that final version is a fraction of the original CAD file in size. The files may be categorized and kept confidential behind a firewall or in a cloud environment. The file may preserve the original style sheets/colors and logos of the company that owns or sells the product.

The generated materials may among other things (a) be preserved by service provider 130 in one or more repositories (such as, for example, database 131, which, while shown as a single standalone device, may in fact be distributed), (b) contain possibly inter alia one or more of watermarks, logos, banners, advertisements, links (such as for example a URL, etc.), promotional material, coupons, vouchers, gift cards, etc., and (c) be optimized in any combination of one or more ways including possibly inter alia by size, by density, by color depth, by duration, etc.

At 250, service provider 130, via server 132, optionally confirms to product manufacturer 110 the successful receipt and/or processing of received information or materials.

In a similar fashion, retailer 122 can open or establish a communications channel with service provider 130 at 260, and send, convey, transfer, etc. to service provider 130 various forms of information including inter alia listings of products for sale, pricing information, availability information, similar or related products, etc. Such information can likewise be stored in database 131 at 265 of service provider 130. Confirmation of receipt may be performed at 270.

The specific interactions that were described above (as residing under designated Set 1 in FIG. 2) are illustrative only and it will be readily apparent to one of ordinary skill in the relevant art that numerous other interactions are easily possible. For example, and inter alia, any combination of the depicted interactions may be repeated any number of times. Also, while the instant embodiment provided for both manufacturer 110 and retailer 120 to send or convey information directly to service provider 130, manufacturer 110 and retailer 120 could likewise, and perhaps more easily, permit service provider 130 to directly access database 111 (of manufacturer 110) or a similar database (not shown) operated by retailer 120. It is noted that while database 111 is depicted as being physically near server 112, both database 111 as well as server 112 (along with the other servers and databases described herein) may be supported within a "cloud" computing environment.

FIG. 3 shows an example ladder diagram 300 that depicts communication exchanges among a user's wireless device 140, service provider 130 and retailer 120 in accordance with the techniques described herein. In the interactions designated under Set 2 in FIG. 3, a user, at 310, employs their wireless device 140 to possibly inter alia acquire a product-related artifact. The artifact may among other things comprise a QR code (as depicted at 205), a barcode symbol 210, a Universal Product Code (UPC) symbol, textual information, audio/sound recognition etc. The artifact may be located in or on, inter alia, an advertisement (that appears during a television show, is in a newspaper, is in a magazine, is on a billboard, is on a sign, is in product literature, is in a brochure, etc.), a piece of mail, on a Web page, in a store or other retail establishment, etc.

The artifact may be acquired through any combination of one or more mechanisms such as inter alia a scan operation (employing for example the camera in wireless device 140), a Near Field Communication (NFC) exchange, manual entry, Wi-Fi, etc. As well, the artifact may be acquired as a result of a (e.g., Google, Bing, etc.) search by the user.

As shown in FIG. 3, at 315, the acquired artifact is conveyed to service provider 130. Such a conveyance may among other things employ any combination of one or more mechanisms including inter alia a (Short Message Service (SMS), Multimedia Message Service (MMS), Internet Protocol (IP) Multimedia Subsystem (IMS), etc.) message exchange, a Wireless Application Protocol (WAP) exchange, an unstructured data transfer, a data transfer operation atop one or more proprietary or standards-based protocols, an Electronic Message (E-Mail) exchange, an Instant Messaging (IM) exchange, a voice telephone call, Wi-Fi, etc.

Communication 315 may also pass through any combination of one or more intermediate entities such as inter alia a wireless carrier, a messaging intermediary, an Internet Service Provider (ISP), etc.

At 320 and 325, service provider 130 processes the received artifact 210 and inter alia retrieves various product information (such as inter alia images, video clips, description, specification, price, availability, reviews, ratings, etc.) from one or more repositories. Such processing and retrieval operations may involve, leverage, etc. among other things one or more data sources internal and/or external to service provider 130, exchanges with one or more entities external to service provider 130, the Internet and the World Wide Web, etc.

As indicated at 330, service provider 130, using, e.g., server 132, conveys aspects of the retrieved product information to wireless device 140. Such a conveyance may among other things employ any combination of one or more mechanisms including inter alia a (SMS, MMS, IMS, etc.) message exchange, a WAP exchange, an unstructured data transfer, a data transfer operation atop one or more proprietary or standards-based protocols, an E-Mail exchange, an IM exchange, a voice telephone call, Wi-Fi, etc. and, as noted above, pass through any combination of one or more intermediate entities such as inter alia a wireless carrier, a messaging intermediary, an ISP, etc.

The specific interactions that were described above (as residing under designated Set 2 in FIG. 3) are illustrative only and it will be readily apparent to one of ordinary skill in the relevant art that numerous other interactions are easily possible. For example, and inter alia, any combination of the depicted interactions may be repeated any number of times (as for example a user peruses, drills-down into, etc. the product information; requests additional, different, etc. product information; performs one or more price, characteristic, feature, etc. comparison shopping exercises; etc.)

In FIG. 3 the interactions that are collected under designated Set 3 represent activities that might take place as possibly inter alia a user employs their wireless device 140 to purchase a Product 150. Specifically, at 335, the user may convey a purchase request to service provider 130 via server 132. That purchase request may then be passed, at 340, to retailer 120.

It should be noted that the purchase request may go directly to retailer 120 without being relayed by service provider 130. In that event, and to keep service provider 130 informed of the purchase transaction, retailer 120 may separately notify service provider of the purchase, including any identifying information associated with the user (i.e., the purchaser).

In the depicted course of events, retailer, at 345, may reply to wireless device 140 via service provider 130 to indicate a receipt of the request, complete the purchase transaction, or convey a "thank you" message, among other possible forms of communication. Ultimately, the purchased product 150 is sent or otherwise conveyed to the user.

The specific interactions that were described above (as residing under designated Set 3 in FIG. 3) are illustrative only and it will be readily apparent to one of ordinary skill in the relevant art that numerous other interactions are easily possible. For example, and inter alia, any combination of the depicted interactions may be repeated any number of times; additional interactions with other entities such as for example a bank, financial institution, credit card clearinghouse, etc. may take place; additional interactions with one or more of the depicted entities may take place as for example a user confirms a purchase request (using a Personal Identification Number (PIN), a limited-use or one-time credential, etc.) and/or receives a purchase confirmation; etc.

Reference is now made to FIG. 4, which shows an example ladder diagram 400 that depicts communication between a user and service provider 130 to deliver information about product 150 and enable access to an array of follow-on or supplementary interactive activities and/or information. In FIG. 4 the interactions that are collected under designated Set 4 represent the activities that might take place as a user employs their wireless device 140 to possibly inter alia acquire an artifact, at 410, associated with product 150. Such an artifact may among other things comprise inter alia a QR code 205, a barcode symbol 210, a UPC symbol, textual information, etc. The artifact may be located on packaging of product 150 or on the product itself, etc. The artifact may be acquired through any combination of one or more mechanisms such as inter alia a scan operation (employing for example the camera in the user's wireless device 140), a NFC exchange, manual entry, Wi-Fi, etc. In another possible embodiment, a user, through an application on their wireless device 140, may conduct a search for a particular product (rather than relying on, e.g., a QR code scan) to enable access to the collection of supplemental information. Searches may be conducted by inter alia product name, number, manufacturer, serial number, color, size, price, date of purchase, etc.

At 415, the acquired artifact is conveyed to service provider 130. Such a conveyance may among other things employ any combination of one or more mechanisms including inter alia a (SMS, MMS, IMS, etc.) message exchange, a WAP exchange, an unstructured data transfer, a data transfer operation atop one or more proprietary or standards-based protocols, an E-Mail exchange, an IM exchange, a voice telephone call, Wi-Fi, etc., and pass through any combination of one or more intermediate entities such as inter alia a wireless carrier, a messaging intermediary, an ISP, etc.

As represented by 420 and 425, service provider 130 processes the received artifact and inter alia retrieves various generated materials (of a type, nature, etc. as for example described above) from one or more repositories (e.g., database 131). Such material may optionally be augmented with inter alia information on, coupons for, links or references to, etc. for example after-market or product-related products and/or services. The information used to augment the materials being sent to the user is referred to herein as "supplemental information." In an embodiment, supplemental information delivery logic 134 is used to select which forms of supplemental information is to be delivered to a user's wireless device.

Supplemental information delivery logic 134 may also be operable to have access to and handle purchasing and replacement instructions for products (or parts of products) served by the system. Purchase of products/parts can be completed directly with service provider 130 or by pushing the appropriate information to another selling website or directly back to retailer 120 or manufacturer 110.

At 430, service provider 130 possibly inter alia conveys aspects of the retrieved generated materials (and supplemental information) to the user's wireless device. Such a conveyance may among other things employ any combination of one or more mechanisms including inter alia a (SMS, MMS, IMS, etc.) message exchange, a WAP exchange, an unstructured data transfer, a data transfer operation atop one or more proprietary or standards-based protocols, an E-Mail exchange, an IM exchange, a voice telephone call, Wi-Fi, etc. and pass through any combination of one or more intermediate entities such as inter alia a wireless carrier, a messaging intermediary, an ISP, etc.

The specific interactions that were described above (as residing under designated Set 4 in FIG. 4) are illustrative only and it will be readily apparent to one of ordinary skill in the relevant art that numerous other interactions are easily possible. For example, and inter alia, any combination of the depicted interactions may be repeated any number of times (as for example a user peruses, manipulates, drills-down in to, etc. aspects of the generated materials).

The Set 1→Set 4 interactions that were described above in connection with FIGS. 2-4 are illustrative only and it will be readily apparent to one of ordinary skill in the relevant art that numerous other interactions, interaction arrangements, etc. are easily possible. For example, and possibly inter alia, various of the request, response, confirmation, etc. interactions that were described above may optionally contain any combination of one or more of information elements (such as for example a relevant or applicable factoid, a piece of Product information, etc.), advertisements, promotional items, coupons, vouchers, surveys, questionnaires, gift cards, retailer credits, etc. Such material may be selected statically or randomly (from for example a repository of defined material), may be location-based (for example, selected from a pool of available material based on possibly inter alia information about the current physical location of a Customer's wireless device), may be Product-specific, etc.

Further, any number of revenue share plans may be supported with, as just one example, service provider 130 acting as a plan administrator for all of the different entities residing upstream and/or downstream of service provider 130 and completing inter alia various billing, fund collection, fund distribution, etc. operations.

Figure 13:
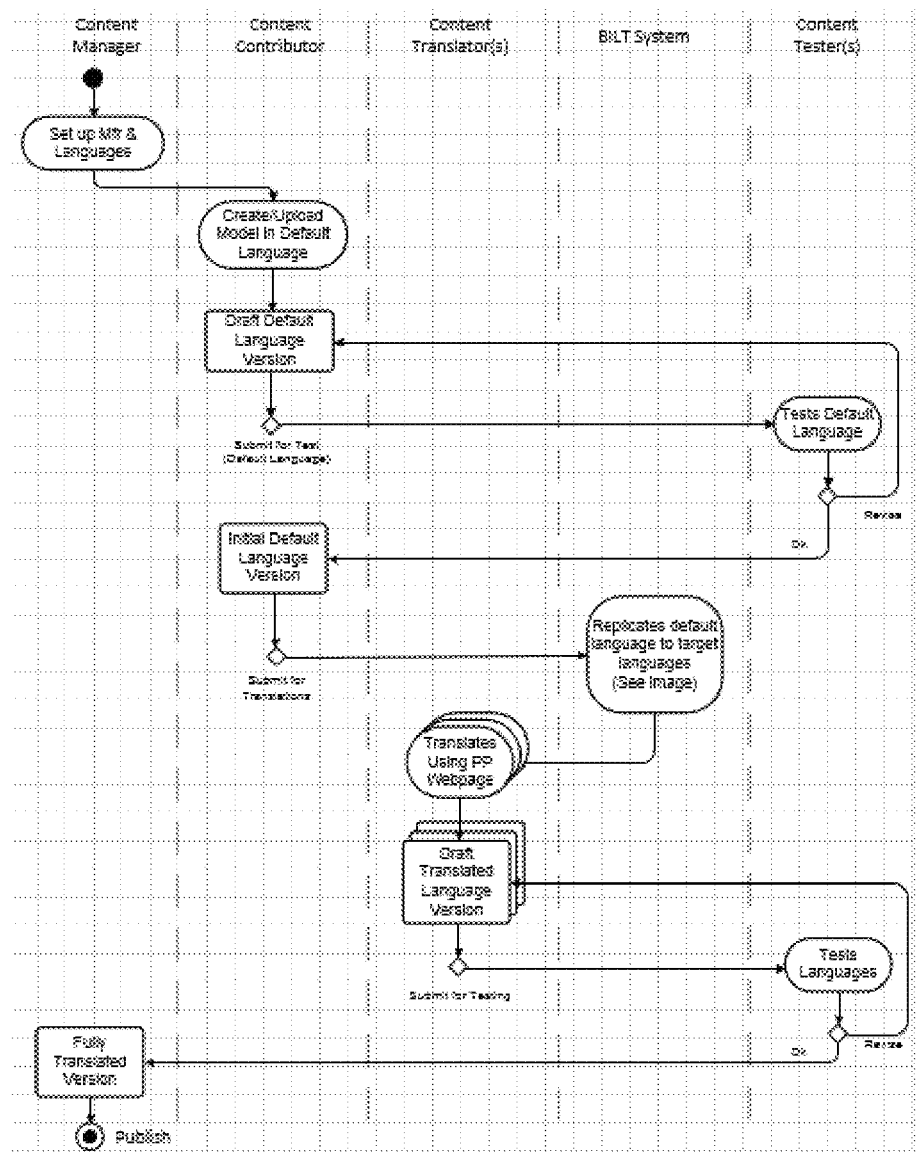
FIG. 13 depicts aspects of a localization process that may be available in accordance with the techniques described herein.

Further still, various of the information that is conveyed to a Customer's wireless device may among other things be adapted to meet specific localization needs such as language, date and time format, etc. Such adaptations may be driven by among other things a user's preferences, information about the current physical location of a user's wireless device 140, etc. and may leverage previously-prepared pools of material (such as for example a U.S.-specific pool of material, a U.K.-specific pool of material, a French-specific pool of material, etc.) and/or dynamically generate any localization-specific material that may become needed. FIG. 13 depicts one possible example of aspects of a localization process.

The information that is conveyed to a user's wireless device 140 may include among other things details, materials (such as labels, etc.) for help or support, product return, product exchange, etc.

The repositories that were described above may:

1) Encompass among other things any combination of one or more of conventional Relational Database Management Systems (RDBMSs), Object Database Management Systems (ODBMS), in-memory Database Management Systems (DBMS), specialized facilities such as for example SAP HANA® or Sybase IQ, equivalent data storage and management facilities, etc.

2) Be supported through "cloud" services, where the actual physical location of the repositories may be unknown to the user(s) of the repositories.

Figure 12:
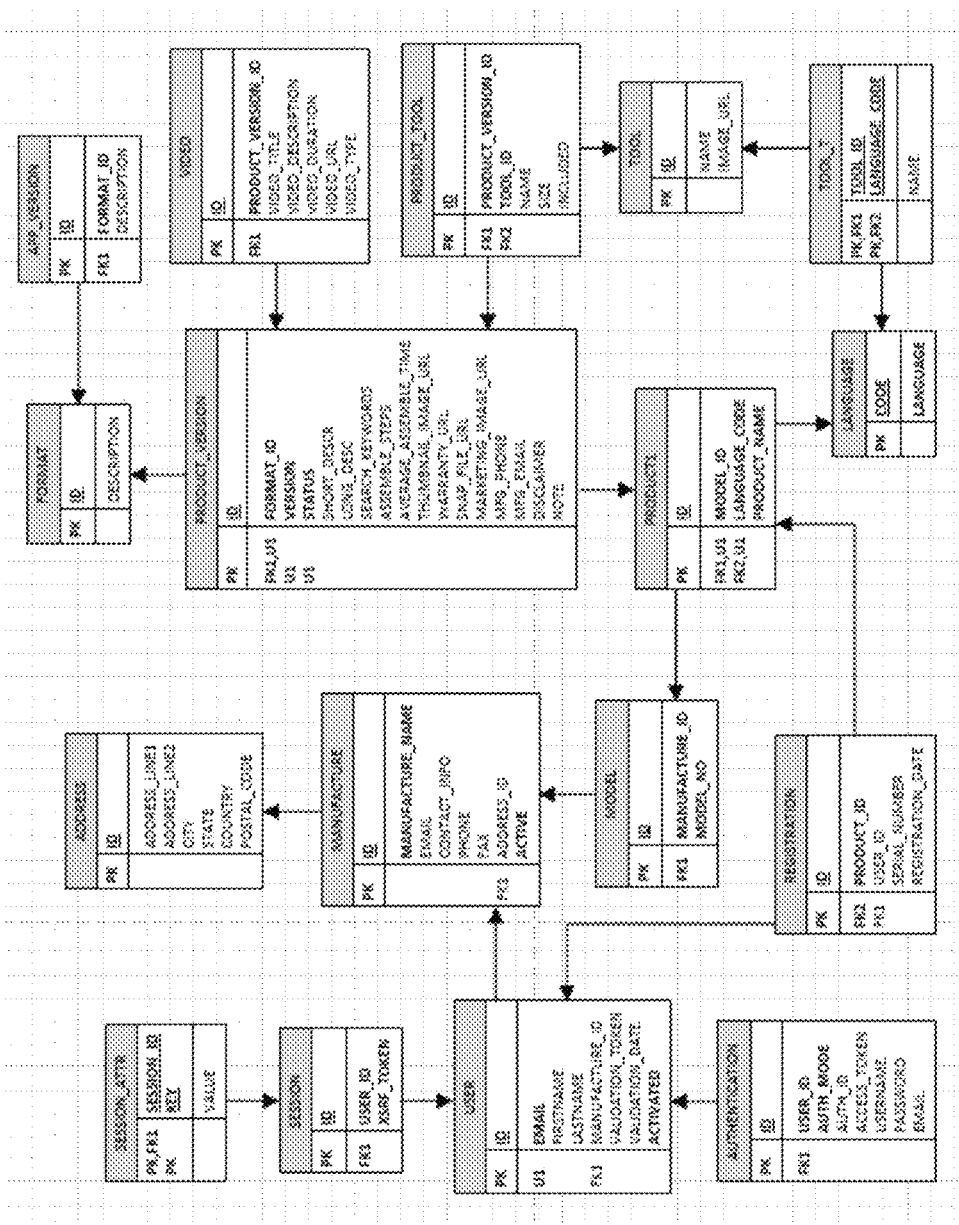
FIG. 12 depicts aspects of a logical data model that may be available in accordance with the techniques described herein.

3) Employ one or more logical, physical, etc. data models. One possible example of a logical data model is depicted in FIG. 12.

4) May be realized through any combination of one or more different arrangements. As just one example, a single 'logical' view of a repository might be offered with, behind the scenes, a tiered physical arrangement comprising (possibly inter alia):

A) A first (e.g., perhaps SAP HANA-based) facility within which the most recent (e.g., 30 days) of data may be stored), B) A second (e.g., perhaps SAP IQ-based) facility within which less-recent (e.g., 31 day to 60 day old) data may be stored, and C) A third (e.g., perhaps Hadoop-based) facility within which older (e.g., 61 day to 2 year old) data may be stored with, among other things, supporting services such as aging, roll-off, migration, access, backup and recovery, security, etc.

Among other things a service provider may receive and/or pull audio, images, video, etc. among a user, from various public sources (such as for example web sites, social media outlets, etc.), from various private sources, etc. A service provider may process, manipulate, augment, preserve, etc. such material so that among other things the service provider can 'match' a user-supplied voice fragment, picture, video clip, etc. to a preserved entry and inter alia identify an issue or a problem, recommend a solution, alter the materials that are delivered to a user's wireless device, etc.

Among other things a service provider may support a range of programs, offers, etc. that a user may elect or otherwise engage with among other things one or more optional charges (one-time, recurring, etc.) associated with same.

A service provider may support a program through which local providers or resources may 'register' with the service provider and for which the service provider may maintain inter alia descriptive information, contact details (such as physical address(es), telephone number(s), web site address (es), e-mail address(es), IM handles, social media handles or identifiers, etc.), capability information (such as available services, pricing, etc.), rating or review information, etc.

Any number of revenue share plans may be supported with as just one example a service provider acting as an plan administrator for all of the different entities residing upstream and/or downstream of the service provider and completing inter alia various billing, fund collection, fund distribution, etc. operations.

Through all of the above a product or service provider (e.g., a manufacturer, a distributor, a retailer, a service delivery organization, etc.) may among other things gather, collect, develop, etc. insight into inter alia:

1) The location of a user (through for example a LBS, GPS, etc. facility).

2) The dates and/or times of a user's interactions.

3) User satisfaction (through for example surveys, feedback, comments, rankings, scores, etc.) of inter alia an entire process and/or the steps in a process with among other things various of the generated, delivered, etc. materials.

4) Product or service comparisons.

5) Incremental product, service, part, plan, upsell, etc. purchases that are completed by a user.

6) Through time stamps, check points, user navigation, etc. information on (a) how long it took a user to complete each step of a process, (b) how long it took a user to complete an entire process, (c) steps during which a user may have encountered one or more challenges, etc.

7) User purchase activity.

8) The completion by a user of items such as registration, warranty, etc.

9) Whether a user accessed, read, utilized, etc. items such as a User Guide, etc., and among other things report on, perform analysis on, etc. same. Such activities may among other things:

1) Help a manufacturer, retailer, etc. to identify user assembly, installation, use, repair, etc. challenges and drive inter alia changes, improvements, etc. to processes, procedures, materials, product design, etc.

2) Help focus or drive for example marketing programs, targeted advertising, offered programs and plans, etc.

Figure 8:
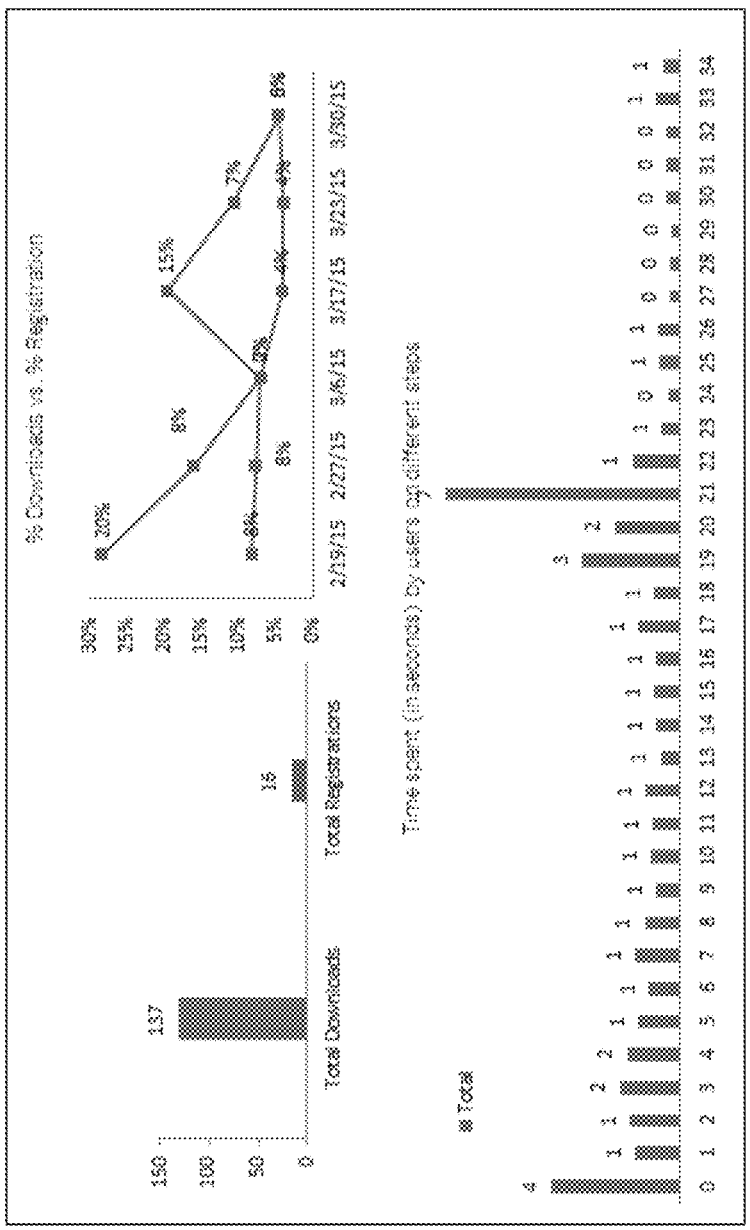
FIG. 8 depicts various analytics that may be available in accordance with the techniques described herein.

Among other things service provider 130 may offer various reporting mechanisms including among other things scheduled (e.g., hourly, daily, weekly, etc.) reporting, on-demand reporting, scheduled (e.g., hourly, daily, weekly, etc.) data mining operations, and/or on-demand data mining operations with results delivered through any combination of one or more of (SMS, MMS, IMS, etc.) messaging, a Web-based facility, E-Mail, data transfer operations, a Geographic Information System (GIS) or other visualization facility, etc. Such reporting mechanisms (one possible example of which is depicted in FIG. 8) may draw from repositories within service provider 140 and/or any number of data sources external to service provider 130.

Reporting information can include inter alia:

Which assembly files were download from a server;
Whether assembly instructions were actually used;
How long in, e.g., seconds the assembly instructions were used;
How long it took each user to advance to the next step;
What other processes were engaged at what point in the assembly process;
How often updates are pushed or accepted by the user;
Warranty related information;
After purchase parts ordering;
How often a QR code was used compared to searching for participating products;
How many and how often updated or new files were sent form the manufacturer;
and
Aggregated information representing all users of the application and the device and operating system deployed on the device.

In the same vein, supplemental information delivery logic 134 may be operable to generate and display for a user analytics about aggregated product categories.

The interactions that were described above may employ among other things various addressing artifacts such as inter alia telephone numbers, short codes, IP addresses, E-Mail address, IM handles, Session Initiation Protocol (SIP) addresses, etc. Indeed, such addressing artifacts may be leveraged by service provider 130 to match an incoming request for information (triggered by a scan of a QR code, bar code, etc.) to a prior purchase or prior conveyance of information so as to "tune" or select appropriate types of supplemental information to be delivered to wireless device 140.

For convenience and ease of exposition a single service provider 130 is depicted in FIGS. 1-4. Those skilled in the art will appreciate that other arrangements are easily possible including for example two, three, or more service providers as well as entities (such as inter alia retailers, service bureaus, intermediaries, aggregators, software firms, etc.) performing various combinations of the functions described above with respect to service provider 130.

Various of the request, response, confirmation, etc. interactions that were described above may optionally leverage, reference, etc. information on the current physical location of a user's wireless device 140 as obtained through inter alia a one or more of a Location-Based Service (LBS) facility, a Global Positioning System (GPS) facility, etc. to among other things enhance security, provide more applicable or appropriate information, etc.

Various of service provider 130 interactions, processing activities, etc. may leverage, incorporate, reference, etc. one or more internal and/or external demographic, psychographic, financial, etc. data sources.

Various of the reviews, ratings, etc. that were described above may be captured, retrieved, etc. from various external sources including for example public web sites, may be obtained from or through different data feeds, etc.

The example that was presented above is illustrative only and it will be readily apparent to one of ordinary skill in the relevant art that numerous variations, alternatives, etc. are easily possible.

For example and inter alia instead of viewing something while watching television, a user might just as easily see something while reading a newspaper or magazine, while browsing the World Wide Web, while passing a billboard or sign, while going through a piece of mail, or while in a store or other retail establishment, etc.

Also, instead of the example of assembly of a product (i.e., the tricycle) those skilled in the art will appreciate that one can apply the foregoing techniques to any number of other things including inter alia the assembly of a piece of furniture, the installation of an appliance, the repair of an appliance, the construction of a model, the installation/configuration/etc. of an electronic device, an automotive repair, a homeowner's (plumbing, electrical, carpentry, etc.) do-it-yourself project, the assembly of a toy, the assembly and/or installation of a piece of exercise equipment, etc.

Further, it is noted that, while the example that was presented above has a consumer focus, it will be readily apparent to a person having ordinary skill in the art that numerous other focuses (such as inter alia a service representative, a repair technician, an office worker, a factory worker, etc.) are easily possible with various of those focuses possibly employing different combinations, subsets, etc. of the interactions or exchanges that were described above.

Figure 10:
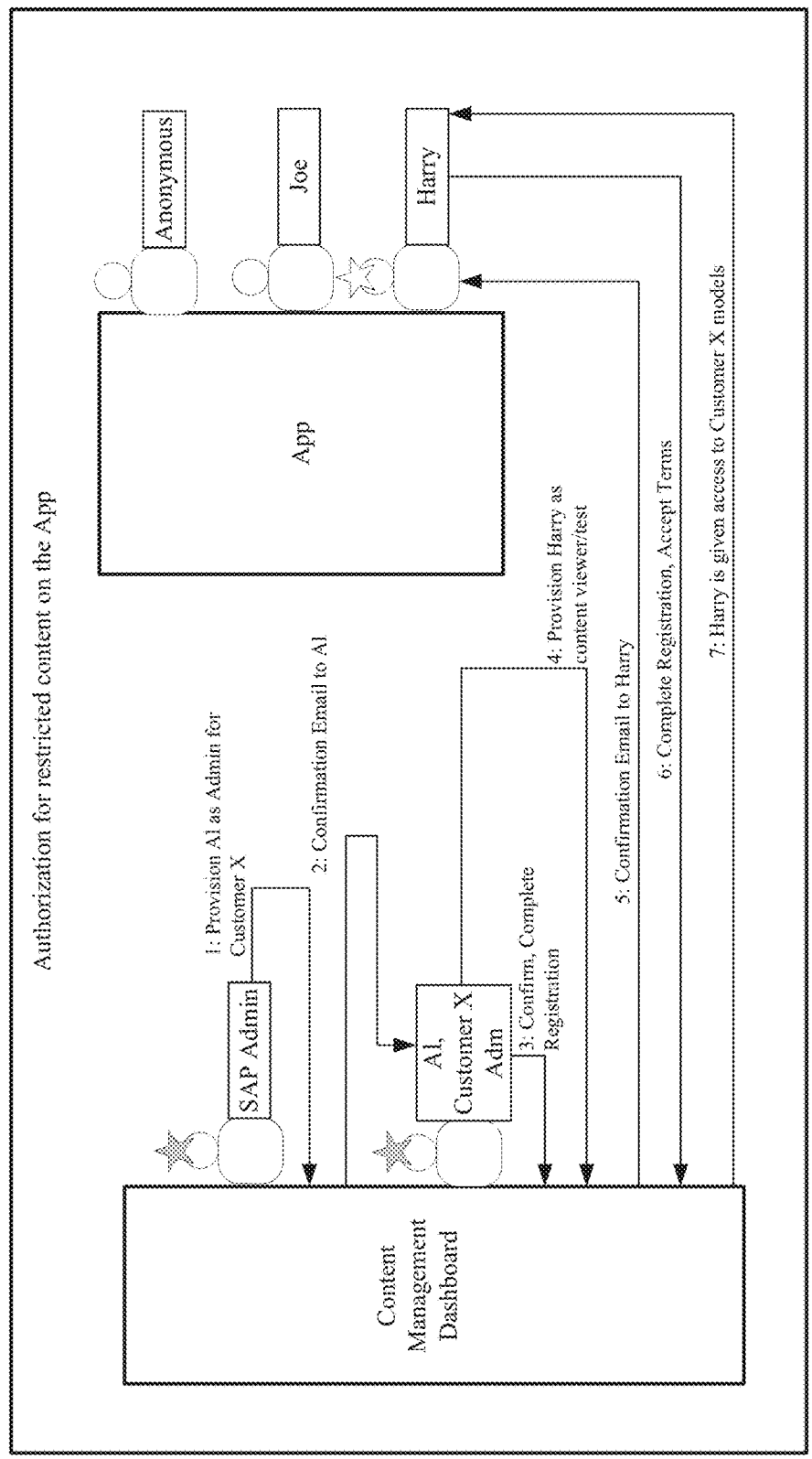
FIGS. 10-11 depict aspects of content access restriction mechanisms that may be available in accordance with the techniques described herein.
Figure 11:
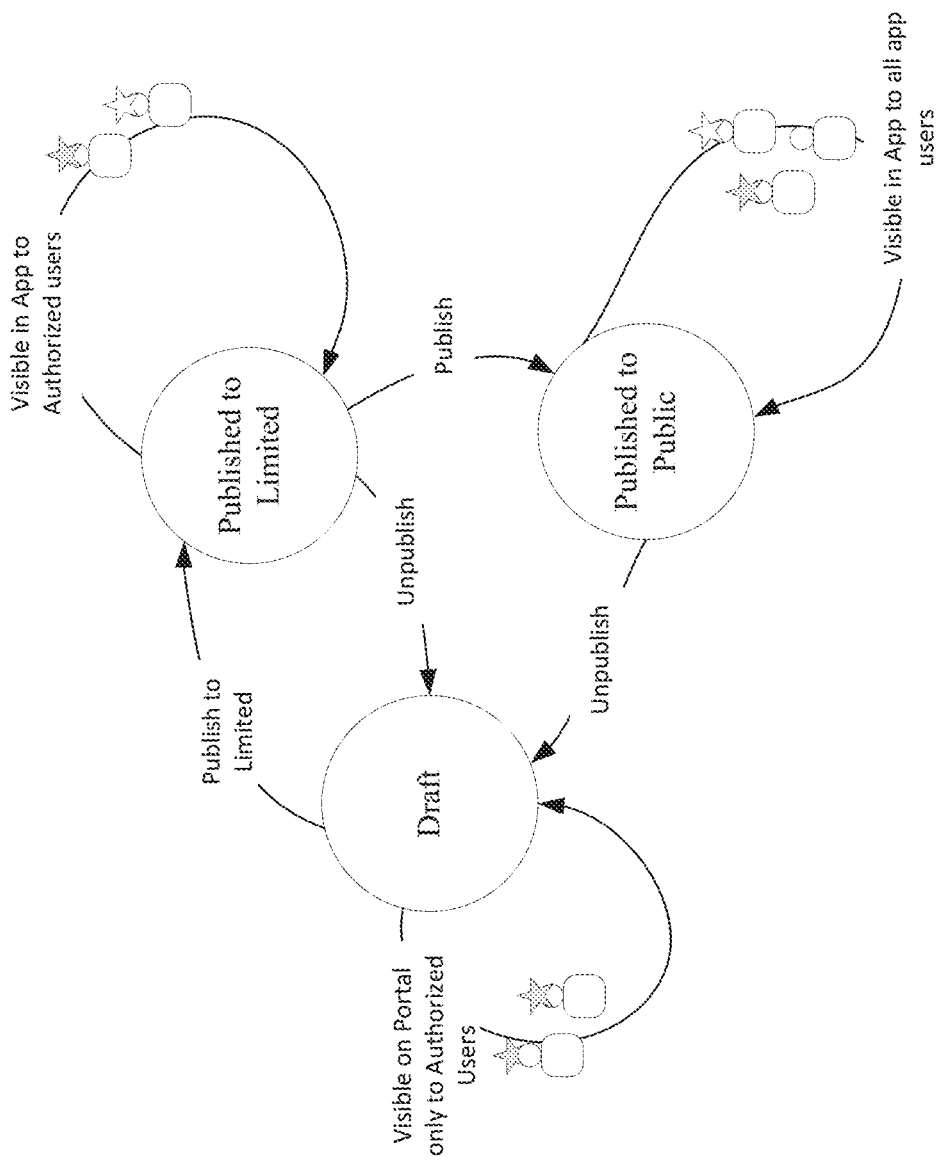

In support of such other focuses a number of additional features, functions, capabilities, etc. may arise including inter alia content access restrictions. For example, within a repair technician focus (as just one example) an individual technician may be limited to the specific content that she may access, retrieve, view, etc. FIGS. 10 and 11 depict aspects of how portions of such limitations may be realized and may employ, leverage, utilize, etc. among other things a range of (one-time, persistent, etc.) access credentials, information on the current physical location of a user's wireless device (through for example LBS, GPS, etc. facilities), restriction definitions (such as for example lists (for example, Access Control Lists (ACLs), rules, logic, etc.), etc.

In support of the above activities a user's wireless device may leverage various applications including for example any combination of one or more of inter alia web-based applications (incorporating for example HTML5, Cascading Style Sheets (CSS), JavaScript, etc.), hybrid applications (incorporating for example containerization, etc.), native applications, Rich Internet Applications (RIAs), Rich User Applications (RUAs), etc. As well, such an application may employ, leverage, etc. aspects of an API to access, receive, retrieve, etc. information from inter alia a SP.

Various of the interactions that were described above may optionally include one or more speech recognition, content-to-speech, etc. mechanisms. For example, as an assembly step is being illustrated, depicted, etc. aspects of the content may be read, spoken, etc. through inter alia a synchronized content-to-speech mechanism. Additionally, a user may optionally employ spoken commands to control, manage, etc. the display, presentation, etc. of content on their wireless device.

Various of the interactions that were described above may optionally include one or more mechanisms that inter alia dynamically account, adjust, etc. for among other things the compressed display real estate that is frequently available on a wireless device. For example, as an assembly step is being illustrated, depicted, etc. only a small portion of any descriptive text may be initially displayed with a user having an option to select, expand, etc. the remaining text, additional text, etc.

Figure 5:
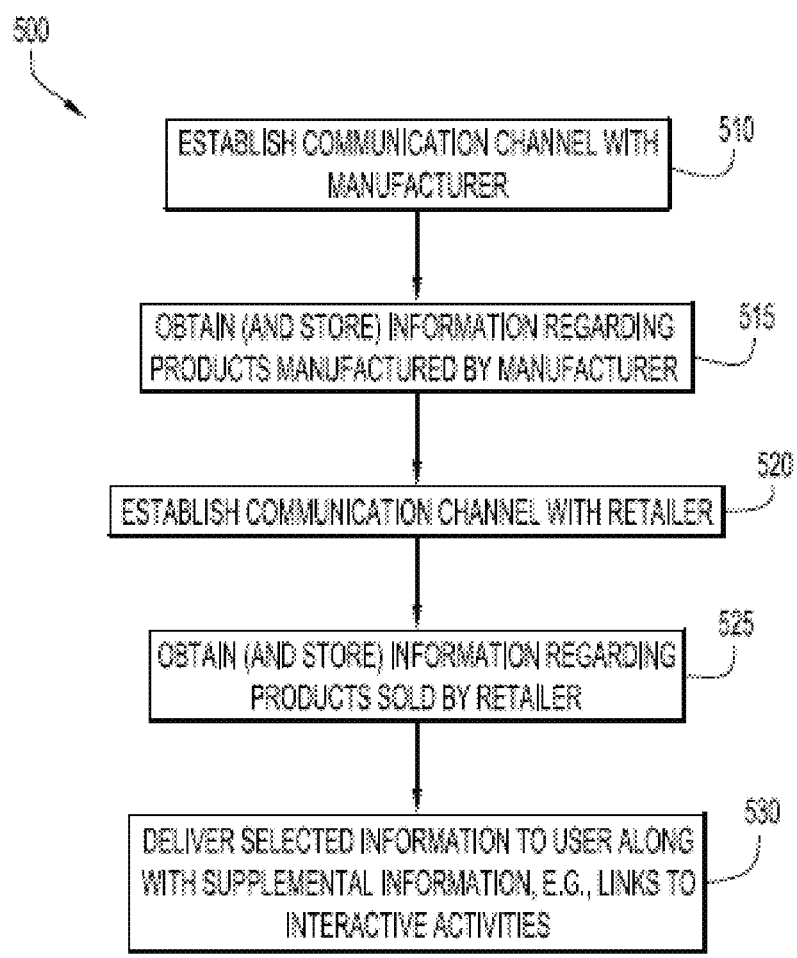
FIGS. 5-6 show example flow charts depicting operations for delivering information about a product and enabling access to an array of follow-on or supplementary interactive activities in accordance with the techniques described herein.

FIG. 5 depicts a flow chart depicting operations 500 in connection with delivering supplementary information about a product or service and enabling access to an array of follow-on or supplementary interactive activities. In an embodiment, supplemental information delivery logic 134 (depicted in FIG. 1) is employed to perform the indicated functionality.

At 510, a communication channel is established with a manufacturer. As noted the communication channel may be over the Internet and employ APIs, or EDI protocols, among other information exchange techniques. The communication channel can also be supported by physical courier, such postal mail and the like. At 515, a service provider obtains (and stores) information regarding products manufactured by the manufacturer.

At 520, a communication channel is established with a retailer. A similar type of channel can be used as with the manufacturer. At 525, the service provider obtains (and stores) information regarding products sold by the retailer.

With the information available to the service provider, the service provider may then, upon receipt of an information request from a user (e.g., a purchaser), deliver, at 530, selected information to the user along with supplemental information embedded therein that might include links to interactive activities based on, e.g., a state of the life cycle of the product. For example, if the product is new, a warranty registration link may be supplied in the form of supplemental information. If the product was purchased long ago, perhaps a link to user's group could be supplied as supplemental information. In other words, there may be information that is directly linked to, e.g., a QR code that is supplied in response to receiving a request for information based on the QR code scan. There is also, supplemental information, that may be supplied and which may be time, location, life cycle, or demographically dependent and that is not necessarily supplied as a result of a request for information based on a QR code.

In the foregoing process, supplemental information delivery logic 134 may be used to both obtain the information from the manufacturer and the retailer as well as to store that information. In addition, supplemental information delivery logic 134 may be used to process the information so that it includes watermarks, logos, URL links, as explained above, and can be delivered as supplemental information embedded or provided along with general information provided to a user. That is, service provider 130, which may be a different entity from both the retailer and the manufacturer, can be responsible for disseminating both the information directly related to a QR code and supplemental information that the service provider might choose as being relevant based on, again, parameters such as time, location, life cycle, or demographics.

Figure 6:
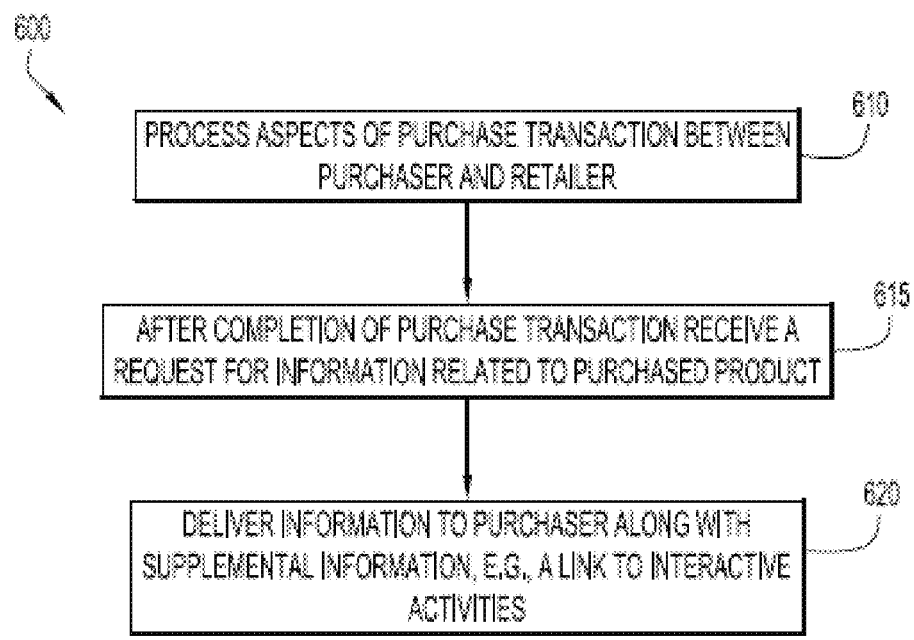

FIG. 6 depicts another possible embodiment in accordance with the techniques described herein. At 610, at least aspects of a transaction between a purchaser (user) and a retailer are processed. This step may include only noting, for example, that a transaction is taking place and keeping track of, e.g., identification information of the user and/or retailer. This step might also be configured to execute the various aspects of the transaction on behalf of the retailer, e.g., collect payment, shipping information, etc.

At 615, subsequent to the completion of the transaction and, e.g., after receipt by the user of a purchased product, a request for information is received, wherein the request is related to the purchased product or service. In the tricycle example, this request may be triggered by the scanning of a QR code and the launching of a browser on a wireless device. The browser is directed to a website of a service provider that maintains a database with supplemental information related to the product associated with the QR code.

At 620, in addition to the general information to be provided as a result of the information request, supplemental information is also delivered to the wireless device, in this case, via the browser, and includes links to, e.g., access interactive activities related to the purchased product. Those links may be operable to lead the user to complete a survey or rating, fill out registration or warranty documents and submit the same, purchase a service plan, or complete a customer satisfaction survey, among other possible interactive activities.

In sum, the techniques described herein enable a user to gain access to a rich collection of supplemental information related to a product or service the user may have purchased. In connection with a product like the example tricycle, the techniques inter alia:

Allow for auto play through an entire instruction set or step by step by selecting a next step versus a "play" button and simply advancing to the next step;

May suggest additional processes the user may complete once the assembly of a product is completed or the user desires to complete communication with supplemental information delivery logic 134;

May show a complete picture of all items needed for assembling a product including a suggested tool or list of tools;

May allow a user to, at any time, the product assembly file can be pause or stop assembly instructions or other supplemental information. When the users decides to use the assembly instructions again the application returns to the exact time and place in the sequencing as before;

May allow the users to pull in more detail product rating information and other technical instructions or procedures pertaining to the product; and Provide a list of all of the models the user has downloaded to her wireless device so information can be easily accessed or revisited again. Such a listing can be presented as a table or by showing images of each model.

The various information (CAD files, BOMs, component part data, manuals, technical documentation, etc.) conveyance, transmission, receipt, etc. activities that were described above may optionally require that one or more setup, configuration, onboarding, etc. activities first be completed.

Figure 9:
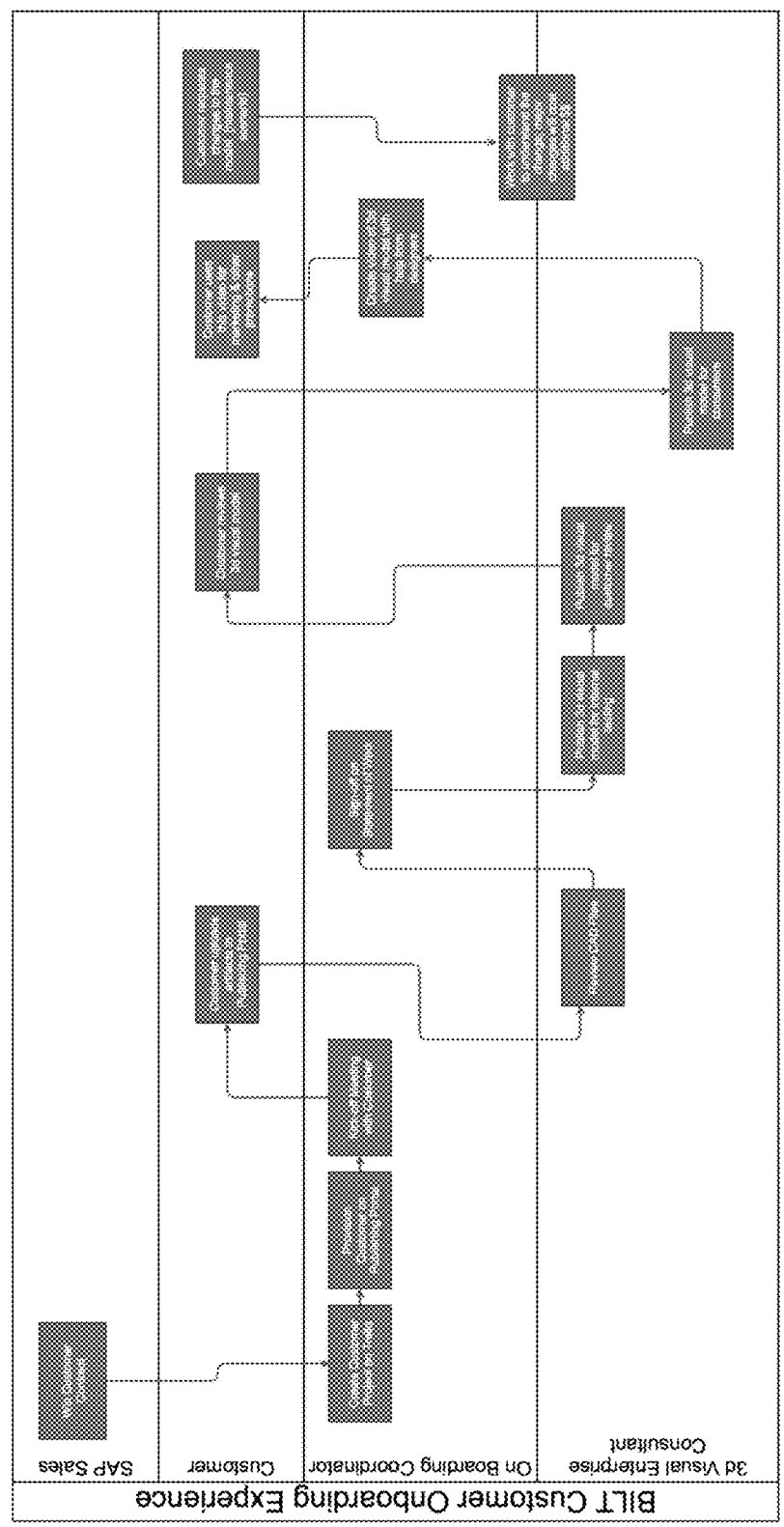
FIG. 9 depicts aspects of a customer onboarding process that may be available in accordance with the techniques described herein.

The various information (CAD files, BOMs, component part data, manuals, technical documentation, etc.) conveyance, processing, etc. activities that were described above may be organized in any number of ways. FIG. 9 depicts aspects of one organization that may be possible where among other things:

1) During an onboarding process various configuration, information capture, account creation, project creation, etc. activities may be completed. Information associated with an account may include inter alia manufacturer name, address, logo, etc. Information associated with a project may include inter alia a title, a description, an overview, warranty details, liability details, contact particulars (such as name, telephone number, etc.), the tools required, etc.

2) Various artifacts (such as for example CAD files, BOMs, etc.) may be received, collected, retrieved, etc.

3) The artifacts may be processed to inter alia account for multiple or different formats, versions, etc.; to render them less dense; to validate, verify, proof, etc. them; to remove elements of Intellectual Property (IP); to place them in a standardized, internal, etc. format; etc.

4) Manual research (involving for example how a product is assembled, etc.) may be conducted.

5) Various animations, illustrations, etc. may be automatically and/or manually generated.

6) Materials (such as for example notes, images of an assembled product, etc.) may be selectively added.

7) Parts, assemblies, etc. may be renamed or otherwise rei-identified (from for example a BOM) to among other things eliminate opaqueness, add clarity, provide context, etc.

8) Various symbols (including for example 2D and/or 3D symbols representing tools, hardware, directional indicators, etc.), thumbnails, etc. may be generated, incorporated, etc.

9) Elements of metadata may be generated, incorporated, etc.

10) Various automated and/or manual testing regimes may be executed, applied, etc., during which any number of file types (such as for example ZIP, PDF, etc.) may be employed, any number of management activities (such as for example versioning, lifecycle control, etc.) may be completed, and any number of process improvement activities (involving for example activity cycle time, file transfer time, file processing time, system resource consumption levels, etc.) may be applied to among other things reduce Total Cost of Ownership (TCO).

In the discussion above one possible arrangement, involving inter alia a manufacturer and a service provider, was presented. It will be readily apparent to one or ordinary skill in the relevant art that numerous alternate arrangements are easily possible including for example:

1) Multiple service providers are possible—to inter alia provide for redundancy, enhanced performance (through for example the distribution of workload), etc.—and may be exposed in different fashions—e.g., individually, through a shared interface as a single logical/virtual/etc. service provider, separately, etc.

2) A service provider may, for example, be realized as an independent service bureau, an element of or within some organization (such as possibly inter alia a financial institution, a retail establishment, an on-line retailer, a corporate entity, etc.), multiple entities (such as for example those just listed) or aspects of same working together, etc.

3) A manufacturer may themselves implement aspects of the features, functions, capabilities, technologies, etc. of a service provider.

Figure 7:
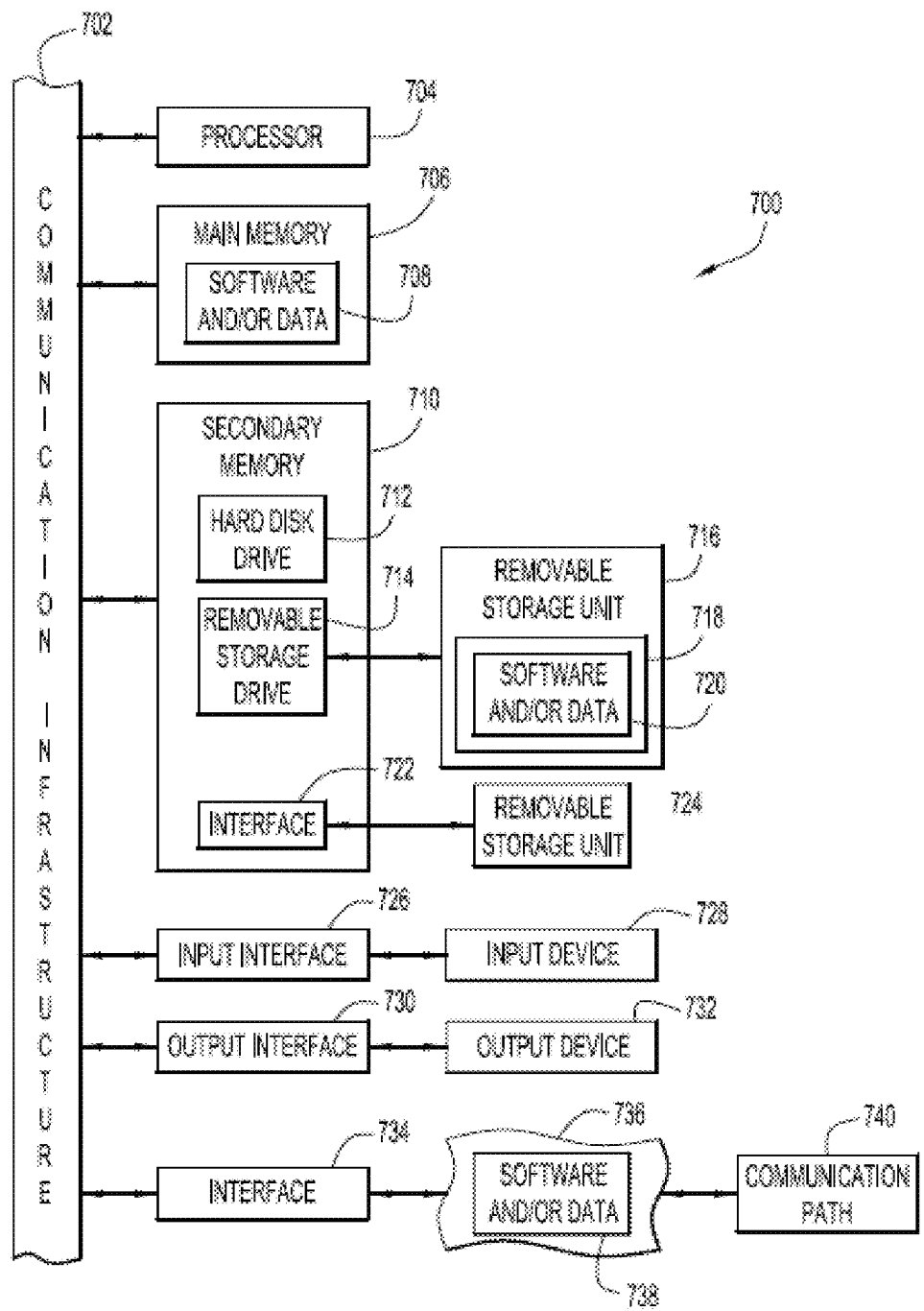
FIG. 7 shows an example block diagram of a computing device capable of operations that cause the delivery of information about a product and access to an array of follow-on or supplementary interactive activities according to the techniques described herein.

FIG. 7 illustrates an example computer system 700 in which aspects of the above disclosure including supplemental information delivery logic 134, or portions thereof, may be implemented as possibly inter alia computer-readable code. Computer system 700 may be (or may be part of) a server (e.g., server 132) or other electronic device or appliance configured to operate in accordance with the functionality described herein.

Computer system 700 includes one or more processors, such as processor 704. Processor 704 can be a special purpose processor or a general purpose processor. Processor 704 is connected to a communication infrastructure 702 (for example, a bus or a network).

Computer system 700 also includes a main memory 706, preferably Random Access Memory (RAM), containing possibly inter alia computer software and/or data 708.

Computer system 700 may also include a secondary memory 710. Secondary memory 710 may include, for example, a hard disk drive 712, a removable storage drive 714, a memory stick, etc. A removable storage drive 714 may comprise a floppy disk drive, a magnetic tape drive, an optical disk drive, a flash memory, or the like. A removable storage drive 714 reads from and/or writes to a removable storage unit 716 in a well-known manner. A removable storage unit 716 may comprise a floppy disk, magnetic tape, optical disk, etc. which is read by and written to by removable storage drive 714. As will be appreciated by persons skilled in the relevant art(s) removable storage unit 716 includes a computer usable storage medium 718 having stored therein possibly inter alia computer software and/or data 720.

In alternative implementations, secondary memory 710 may include other similar means for allowing computer programs or other instructions to be loaded into computer system 700. Such means may include, for example, a removable storage unit 724 and an interface 722. Examples of such means may include a program cartridge and cartridge interface (such as that found in video game devices), a removable memory chip (such as an Erasable Programmable Read-Only Memory (EPROM), or Programmable Read-Only Memory (PROM)) and associated socket, and other removable storage units 724 and interfaces 722 which allow software and data to be transferred from the removable storage unit 724 to computer system 700.

Computer system 700 may also include an input interface 726 and a range of input devices 728 such as, possibly inter alia, a keyboard, a mouse, etc.

Computer system 700 may also include an output interface 730 and a range of output devices 732 such as, possibly inter alia, a display, one or more speakers, etc.

Computer system 700 may also include a communications interface 734. Communications interface 734 allows software and/or data 738 to be transferred between computer system 700 and external devices. Communications interface 734 may include a modem, a network interface (such as an Ethernet card), a communications port, a Personal Computer Memory Card International Association (PCMCIA) slot and card, or the like. Software and/or data 738 transferred via communications interface 734 are in the form of signals 736 which may be electronic, electromagnetic, optical, or other signals capable of being received by communications interface 734. These signals 736 are provided to communications interface 734 via a communications path 740. Communications path 740 carries signals and may be implemented using wire or cable, fiber optics, a phone line, a cellular phone link, a Radio Frequency (RF) link or other communications channels.

As used in this document, the terms "computer program medium," "computer usable medium," and "computer readable medium" generally refer to media such as removable storage unit 716, removable storage unit 724, and a hard disk installed in hard disk drive 712. Signals carried over communications path 740 can also embody the logic described herein. Computer program medium and computer usable medium can also refer to memories, such as main memory 706 and secondary memory 710, which can be memory semiconductors (e.g. Dynamic Random Access Memory (DRAM) elements, etc.). These computer program products are means for providing software to computer system 700.

Computer programs (also called computer control logic) are stored in main memory 706 and/or secondary memory 710. Computer programs may also be received via communications interface 734. Such computer programs, when executed, enable computer system 700 to implement the techniques discussed herein. In particular, the computer programs, when executed, enable processor 704 to implement, e.g., the functions of supplemental information delivery logic 134. Accordingly, such computer programs represent controllers of the computer system 700. Where the techniques are implemented using software, the software may be stored in a computer program product and loaded into computer system 700 using removable storage drive 714, interface 722, hard drive 712 or communications interface 734.

The techniques described herein are also directed to computer program products comprising software stored on any computer useable medium. Such software, when executed in one or more data processing devices, causes data processing device(s) to operate as described herein. Embodiments may employ any computer useable or readable medium, known now or in the future. Examples of computer useable mediums include, but are not limited to, primary storage devices (e.g., any type of random access memory), secondary storage devices (e.g., hard drives, floppy disks, Compact Disc Read-Only Memory (CD-ROM) disks, Zip disks, tapes, magnetic storage devices, optical storage devices, Microelectromechanical Systems (MEMS), nanotechnological storage device, etc.), and communication mediums (e.g., wired and wireless communications networks, local area networks, wide area networks, intranets, etc.).

The instant disclosure is also directed to computer program products comprising software stored on any computer useable medium. Such software, when executed in one or more data processing devices, causes data processing device(s) to operate as described herein. Embodiments of the instant disclosure employ any computer useable or readable medium, known now or in the future. Examples of computer useable mediums include, but are not limited to, primary storage devices (e.g., any type of random access memory), secondary storage devices (e.g., hard drives, floppy disks, Compact Disc Read-Only Memory (CD-ROM) disks, Zip disks, tapes, magnetic storage devices, optical storage devices, Microelectromechanical Systems (MEMS), nanotechnological storage device, etc.), and communication mediums (e.g., wired and wireless communications networks, local area networks, wide area networks, intranets, etc.).

Based on the teachings contained in this disclosure, it will be apparent to persons skilled in the relevant art(s) how to make and use aspects of the instant disclosure using data processing devices, computer systems, and/or computer architectures other than that shown in FIG. 7. In particular, embodiments may operate with software, hardware, and/or operating system implementations other than those described herein.

For simplicity of exposition the above discussion focused principally on consumer orientation. It will be readily apparent to one of ordinary skill in the relevant art that numerous other orientations are easily possible including inter alia service technicians, assembly line workers, health care providers, customer service or care representatives, field service or support personnel, etc.

The above description is intended by way of example only. It will be readily apparent to one of ordinary skill in the relevant art that various modifications and structural changes may be made therein without departing from the scope of the concepts described herein and within the scope and range of equivalents of the claims.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

What is claimed is:

1. A system for the enhanced dissemination of information, the system comprising:
    an acquisition device configured to acquire at least one of a first identification artifact and a second identification artifact;
    a display device; and
    a service provider configured to
        receive a set of information from a first external data source, wherein the set of information relates to an object;
        receive a supplemental set of information from at least the first external data source and a second external data source, wherein the supplemental set of information constitutes a step-by-step graphical instructional file of the object;
        modify the set of information and the supplemental set of information, wherein the sets of information are modified based on at least one of an internal data source, the first external data source, the second external data source, and a third external data source;

receive at least one of the first identification artifact and the second identification artifact from the acquisition device;

wherein if the service provider receives the first identification artifact, the modified set of information is displayed on the display device to a user, and if the service provider receives the second identification artifact, the modified supplement set of information is displayed on the display device to the user;

the acquisition device configured to track the progress of the user through the step-by-step graphical instructional file and to initiate a communication session with a representative associated with the service provider;

the acquisition device transmitting a data transmission including status information on the progress through the step-by-by step graphical instructional file to the service provider enabling the representative to determine the progress through the step-by-step graphical instructional file during the communication session;

receive a response from the user; and transmit the user response to at least the first external data source and the second external data source.

2. The system of claim 1, wherein the first identification artifact identifies the object, and wherein the second identification artifact identifies the modified supplemental set of information.

3. The system of claim 1, wherein the modified set of information includes at least one of a video and an audio recording.

4. The system of claim 1, wherein the set of information and supplemental set of information are stored in a database of the service provider.

5. The system of claim 1, wherein the modified supplement set of information includes at least one of a video and an audio recording.

6. The system of claim 1, wherein the first, second, and third external data sources are at least one of the following: i) object manufacturer, ii) object distributors, iii) object retailers, iv) consumers, v) object owners, vi) social media sources, and vii) the World Wide Web.

7. The system of claim 1, wherein the modified set of information and the modified supplement set of information are at least one of the following: i) object use information, ii) object repair information, iii) object replacement information, iv) object upgrade information, v) object troubleshooting information, and vi) object disposal information.

8. The system of claim 1, wherein the modified set of information and the modified supplemental set of information are configured to be displayed on at least one of a mobile device and a computer.

9. The system of claim 1, wherein the first and second artifacts are at least one of the following: i) a Quick Response (QR) code, ii) a barcode symbol, iii) a Universal Product Code (UPC) symbol, iv) textual information, v) audio recognition, and vi) sound recognition.

10. A non-transitory computer-readable storage device storing program instructions that, when executed, cause an executing device to perform a method for enhancing dissemination of information comprising:

acquiring at least one of a first identification artifact and a second identification artifact from an acquisition device;

receiving, by a service provider, a set of information from a first external data source, wherein the set of information relates to an object;

receiving, by the service provider, a supplemental set of information from at least the first external data source and a second external data source, wherein the supplemental set of information constitutes a step-by-step graphical instructional file of the object;

modifying, by the service provider, the set of information and the supplemental set of information, wherein the sets of information are modified based on at least one of an internal data source, the first external data source, the second external data source, and a third external data source;

receiving, by the service provider, at least one of the first identification artifact and the second identification artifact from the acquisition device;

wherein if the service provider receives the first identification artifact, the modified set of information is displayed on the display device to a user, and if the service provider receives the second identification artifact, the modified supplemental set of information is displayed on the display device to the user;

tracking, by the acquisition device, the progress of the user through the step-by-step graphical instructional file;

initiating, by the acquisition device, a communication session with a representative associated with the service provider;

transmitting, by the acquisition device, a status data transmission including status information on the progress through the step-by-by step graphical instructional file to the service provider enabling the representative to determine the progress through the step-by-step graphical instructional file during the communication session;

receiving, by the service provider, a response from the user; and transmitting, by the service provider, the user response to at least the first external data source and the second external data source.

11. The non-transitory computer-readable storage device of claim 10, wherein the first identification artifact identifies the object and the second identification artifact identifies a set of supplemental information related to the object.

12. The non-transitory computer-readable storage device of claim 11, wherein the first, second, and third external data sources are at least one of the following: i) product manufacturer, ii) product distributors, iii) product retailers, iv) consumers, v) product owners, vi) social media sources, and vii) the World Wide Web.

13. A computer-implemented method, comprising:

acquiring at least one of a first identification artifact and a second identification artifact from an acquisition device;

receiving, by a service provider, a set of information from a first external data source, wherein the set of information relates to an object;

receiving, by the service provider, a supplemental set of information from at least the first external data source and a second external data source, wherein the supplement set of information constitutes a step-by-step graphical instructional file of the object;

modifying, by the service provider, the set of information and the supplemental set of information, wherein the sets of information are modified based on at least one of an internal data source, the first external data source, the second external data source, and a third external data source;

receiving, by the service provider, at least one of the first identification artifact and the second identification artifact from the acquisition device;

wherein if the service provider receives the first identification artifact, the modified set of information is displayed on the display device to a user, and if the service provider receives the second identification artifact, the modified supplemental set of information is displayed on the display device to the user;

the acquisition device configured to track the progress of the user through the step-by-step graphical instructional file and to initiate a communication session with a representative associated with the service provider;

the acquisition device transmitting a data transmission including status information on the progress through the step-by-by step graphical instructional file to the service provider enabling the representative to determine the progress through the step-by-step graphical instructional file during the communication session;

receiving, by the service provider, a response from the user; and transmitting, by the service provider, the user response to at least the first external data source and the second external data source.

14. The method of claim 13, wherein the first identification artifact identifies the object, and wherein the second identification artifact identifies the modified supplemental set of information.

15. The method of claim 13, wherein the modified set of information includes at least one of a video and an audio recording.

16. The method of claim 13, wherein the set of information and supplemental set of information are stored in a database of the service provider.

17. The method of claim 13, wherein the modified supplement set of information includes at least one of a video and an audio recording.

18. The method of claim 13, wherein the first, second, and third external data sources are at least one of the following: i) object manufacturer, ii) object distributors, iii) object retailers, iv) consumers, v) object owners, vi) social media sources, and vii) the World Wide Web.

19. The method of claim 13, wherein the modified set of information and the modified supplement set of information are at least one of the following: i) object use information, ii) object repair information, iii) object replacement information, iv) object upgrade information, v) object troubleshooting information, and vi) object disposal information.

20. The method of claim 13, wherein the first and second artifacts are at least one of the following: i) a Quick Response (QR) code, ii) a barcode symbol, iii) a Universal Product Code (UPC) symbol, iv) textual information, v) audio recognition, and vi) sound recognition.

\* \* \* \* \*